(12) United States Patent
Takano et al.

(10) Patent No.: US 7,933,074 B2
(45) Date of Patent: Apr. 26, 2011

(54) ZOOM LENS UNIT AND INFORMATION DEVICE

(75) Inventors: Yohei Takano, Yokohama (JP); Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/822,807

(22) Filed: Jun. 24, 2010

(65) Prior Publication Data

US 2011/0002047 A1 Jan. 6, 2011

(30) Foreign Application Priority Data

Jul. 6, 2009 (JP) ................. 2009-160298

(51) Int. Cl.
*G02B 15/14* (2006.01)
(52) U.S. Cl. ...................................... 359/687
(58) Field of Classification Search .......... 359/676, 359/683, 687
See application file for complete search history.

(56) References Cited

U.S. PATENT DOCUMENTS

| | | | |
|---|---|---|---|
| 6,697,183 B2 | 2/2004 | Atsuumi et al. | |
| 6,771,407 B2 | 8/2004 | Hayashi et al. | |
| 6,781,729 B2 | 8/2004 | Suzuki et al. | |
| 6,791,729 B2 | 9/2004 | Atsuumi et al. | |
| 6,829,104 B2 | 12/2004 | Suzuki et al. | |
| 6,937,371 B2 | 8/2005 | Hayashi et al. | |
| 6,961,164 B2 | 11/2005 | Atsuumi | |
| 7,006,120 B2 | 2/2006 | Sakai | |
| 7,012,724 B2 | 3/2006 | Atsuumi et al. | |
| 7,038,822 B2 | 5/2006 | Sakai et al. | |
| 7,050,210 B2 | 5/2006 | Atsuumi et al. | |
| 7,068,407 B2 | 6/2006 | Sakai et al. | |
| 7,106,483 B2 | 9/2006 | Hayashi et al. | |
| 7,126,737 B2 | 10/2006 | Atsuumi et al. | |
| 7,139,131 B2 * | 11/2006 | Nanba et al. ............. | 359/687 |
| 7,154,651 B2 | 12/2006 | Atsuumi et al. | |
| 7,164,516 B2 | 1/2007 | Hayashi et al. | |
| 7,236,281 B2 | 6/2007 | Hayashi et al. | |
| 7,271,823 B2 | 9/2007 | Izumi et al. | |

(Continued)

FOREIGN PATENT DOCUMENTS

EP    1 870 759 A1    12/2007

(Continued)

OTHER PUBLICATIONS

Extended European Search Report issued Oct. 19, 2010, in Application No. 10251180.5-1234.

*Primary Examiner* — Scott J Sugarman
(74) *Attorney, Agent, or Firm* — Oblon, Spivak, McClelland, Maier & Neustadt, L.L.P.

(57) ABSTRACT

A zoom lens unit, including in order from an object side to an image side: a first lens group having a positive refracting power; a second lens group having a negative refracting power; a third lens group having a positive refracting power; and a fourth lens group having a positive refracting power, an aperture stop being disposed on an object side of the third lens group, wherein the third lens group has at least two positive lenses and one negative lens, wherein all the positive lenses of the third lens group satisfy the following formula: (1) $-0.005865v_{d3p}+0.93226<\theta_{gF3p}<-0.005865v_{d3p}+0.95226$, where, $v_{d3p}$ represents an Abbe number of each of the positive lenses of the third lens group, and $\theta_{gF3p}$ represents a partial dispersion ratio of each of the positive lenses of the third lens group, defined by the formula: $\theta_{gF3p}=(n_g-n_F)/(n_F-n_C)$.

17 Claims, 20 Drawing Sheets

U.S. PATENT DOCUMENTS

| | | |
|---|---|---|
| 7,298,537 B2 | 11/2007 | Hayashi et al. |
| 7,397,591 B2 | 7/2008 | Hayashi et al. |
| 7,525,710 B2 | 4/2009 | Atsuumi et al. |
| 7,535,654 B2 * | 5/2009 | Ohashi .................. 359/690 |
| 7,616,384 B2 | 11/2009 | Atsuumi |
| 7,636,201 B2 | 12/2009 | Sudoh et al. |
| 7,719,773 B2 | 5/2010 | Atsuumi et al. |
| 2003/0184875 A1 | 10/2003 | Mihara et al. |
| 2004/0161228 A1 | 8/2004 | Nanba |
| 2006/0238845 A1 | 10/2006 | Atsuumi et al. |
| 2007/0206261 A1 | 9/2007 | Hayashi et al. |
| 2007/0216316 A1 | 9/2007 | Hirano et al. |
| 2009/0059335 A1 | 3/2009 | Amada et al. |
| 2009/0080088 A1 | 3/2009 | Ohashi |
| 2009/0147375 A1 | 6/2009 | Sudoh et al. |
| 2010/0238565 A1 | 9/2010 | Takano et al. |

FOREIGN PATENT DOCUMENTS

| | | |
|---|---|---|
| JP | 8-248317 | 9/1996 |
| JP | 3391342 | 1/2003 |
| JP | 2004-199000 | 7/2004 |
| JP | 2004-333768 | 11/2004 |
| JP | 2005-326743 | 11/2005 |
| JP | 2006-189598 | 7/2006 |
| JP | 2008-26837 | 2/2008 |
| JP | 2008-76493 | 4/2008 |
| JP | 2008-96924 | 4/2008 |
| JP | 2008-112013 | 5/2008 |

* cited by examiner

Wide

Mean

Tele

Wide

Mean

Tele

Wide

Mean

Tele

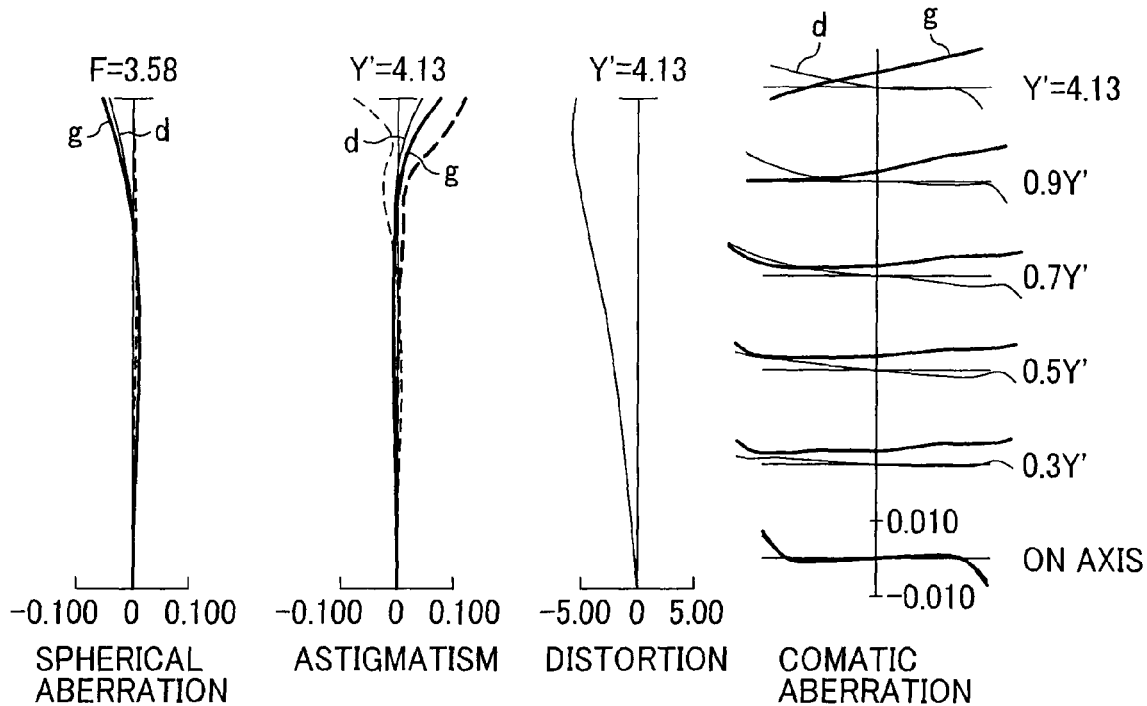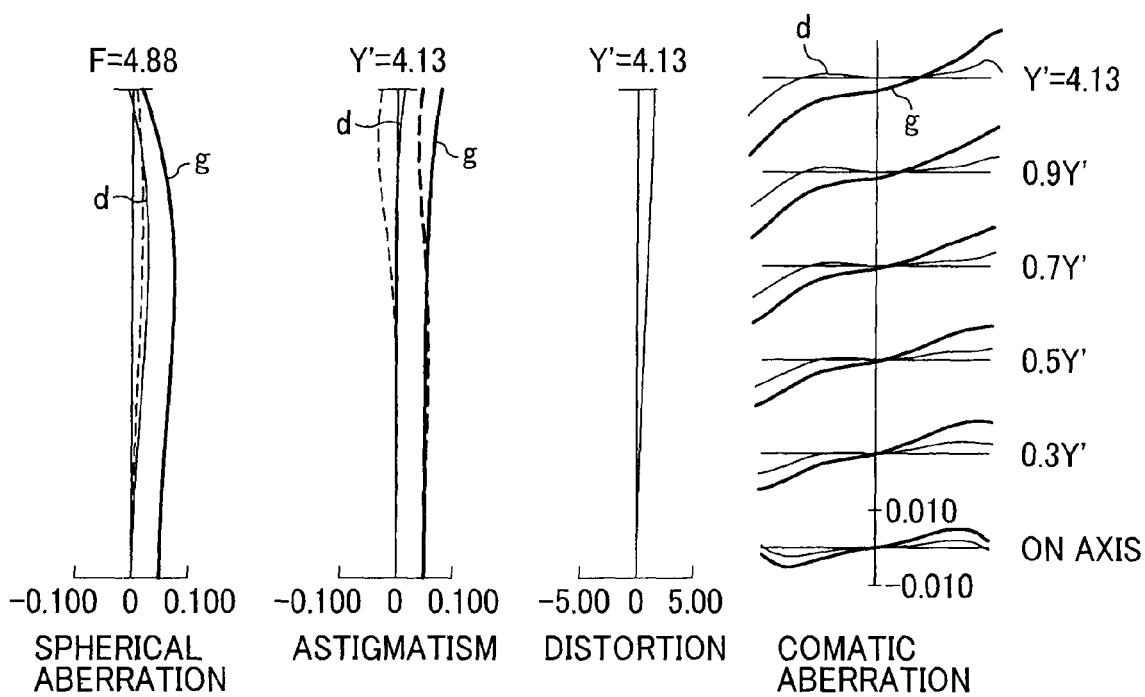

Wide

Mean

Tele

Wide

Mean

Tele

Wide

Mean

Tele

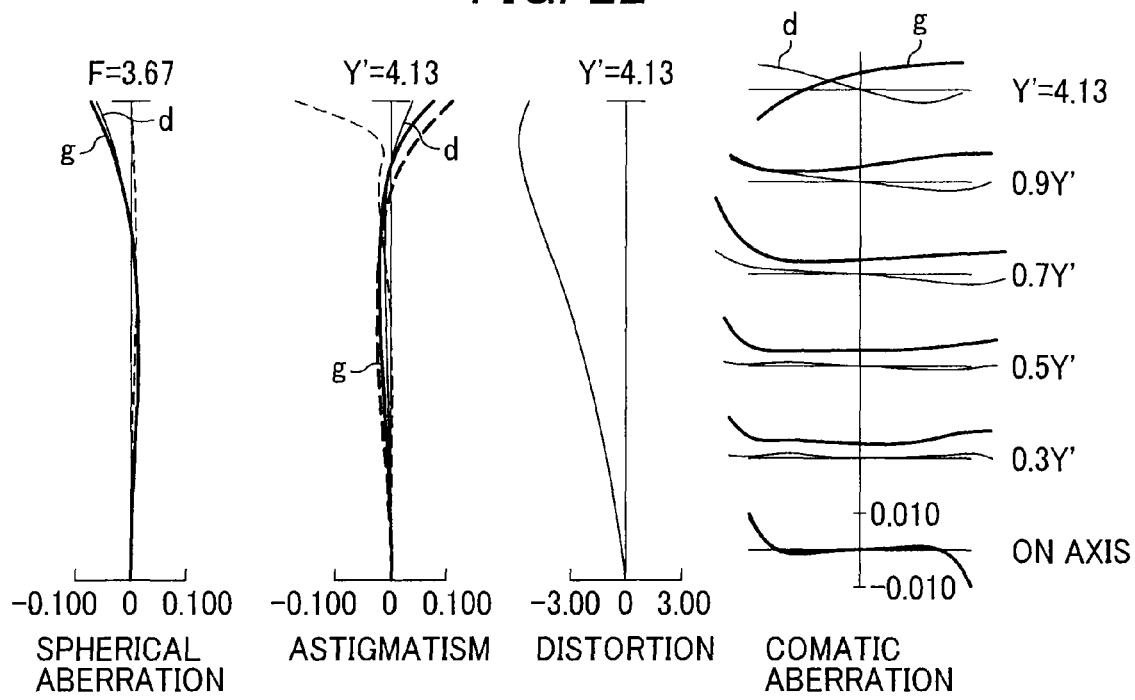
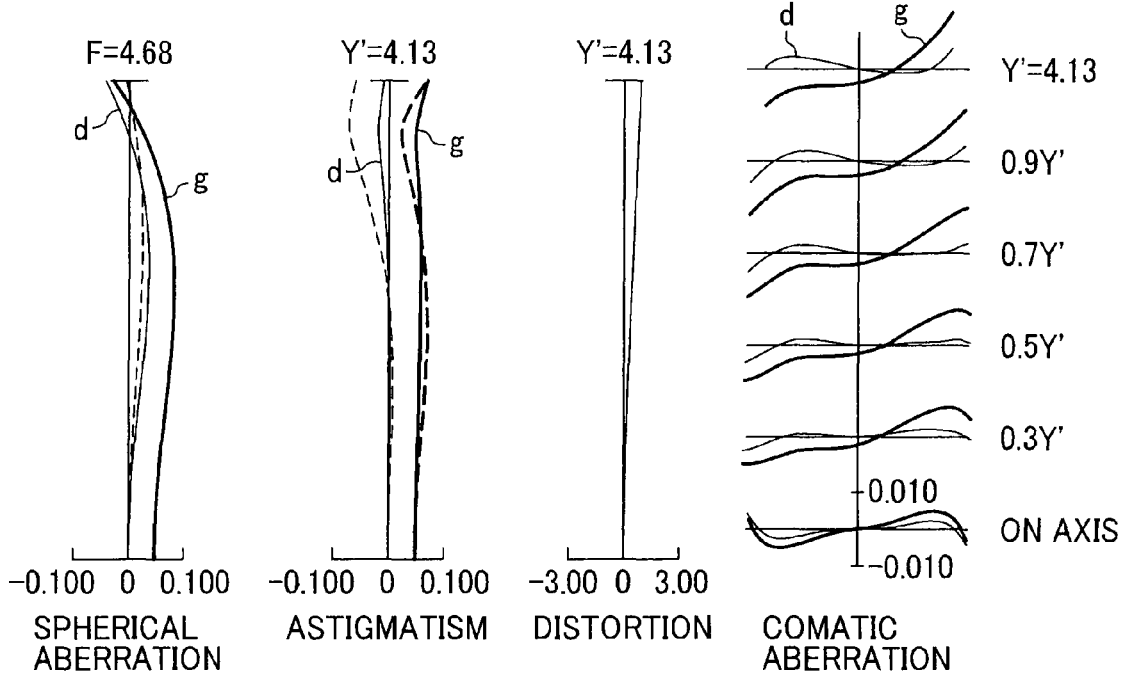

ZOOM LENS UNIT AND INFORMATION DEVICE

CROSS-REFERENCE TO THE RELATED APPLICATION

The entire contents of Japanese patent application, No. JP 2009-160298, filed on Jul. 6, 2009, of which the convention priority is claimed in this application, are incorporated hereinto by reference.

BACKGROUND OF THE INVENTION

1. Field of the Invention

The present invention relates to a zoom lens unit, and an information device. Especially, the present invention relates to an improved zoom lens unit which is used as a photographing optical system, and an information device such as a digital still camera or a video camera or a silver salt camera or a portable information terminal device using the zoom lens unit as a photographing optical system.

2. Description of the Related Art

In recent years, a portable information terminal device provided with a digital camera or a camera which captures a still image or a video image by a CCD (charge-coupled device) image sensor or a CMOS (complementary metal-oxide semiconductor) image sensor, has become popular, instead of a still camera using a silver salt film as an imaging record medium, i.e. a silver salt camera.

The demand of users varies over a wide range. In particular, users always require a more compact imaging device which has a wide angle and a large magnification ratio.

From the viewpoint of compactness of a zoom lens unit which is used as a photographing optical system in the imaging device, it is necessary to shorten a total length of the zoom lens unit when changing magnification (when using), in particularly a total length of the zoom lens unit at a telephoto end.

In addition, from the viewpoint of a wide angle, it is preferable that a half-field angle at a wide-angle end be 38 degrees or more. The half-field angle of 38 degrees corresponds to a focal length of 28 mm in terms of a 35-mm silver salt camera (so-called Leica version).

Furthermore, from the viewpoint of a high magnification ratio, a zoom lens unit with a focus length of about 28-300 mm (about 10 times) in terms of a 35-mm silver salt camera is considered to be capable of responding to almost all general photographing conditions.

For example, as a zoom lens unit constituted of four lens groups, JP 2004-199000 A, JP 2005-326743 A, JP 2008-076493 A, JP 2008-096924 A, JP 2006-189598 A, JP 2008-026837 A and JP 2008-112013 A disclose a zoom lens unit which includes, in order from an object side to an image side, a first lens group having a positive refracting power; a second lens group having a negative refracting power; an aperture stop; a third lens group having a positive refracting power; and a fourth lens group having a positive refracting power, and when changing magnification from a wide-angle end to a telephoto end, an interval between the first lens group and the second lens group increases, an interval between the second lens group and the third lens group decreases, and an interval between the third lens group and the fourth lens group increases, the third lens group having at least two positive lenses and one negative lens.

However, in the zoom lens units disclosed in JP 2004-199000 A, JP 2005-326743 A, JP 2008-076493 A, and JP 2008-096924 A, since magnification ratios are about 2.8 to about 6.8 times, they are insufficient for the user's demand for the magnification ratio nowadays.

In addition, in the zoom lens unit disclosed in JP 2006-189598 A, a magnification ratio is about 15 times, which is large, however since a half-field angle is about 31 degrees, it is insufficient for the user's demand for the wide angle nowadays.

Further, in the zoom lens unit disclosed in JP 2008-026837 A, a magnification ratio is about 10 times, however, since a telephoto ratio is large, it is insufficient for compactness, and it is considered that there is still room for improvement in aberration correction.

In the zoom lens unit disclosed in JP 2008-112013A, although a magnification ratio is about 9.5 times, which is large, a half-field angle is about 40 degrees, and a telephoto ratio is comparatively small, which are favorable points, it is considered that there is still room for improvement in aberration correction of such as chromatic aberration.

SUMMARY OF THE INVENTION

Therefore, at least an object of the present invention is to provide, for example, a compact zoom lens unit with a high magnification ratio and a wide angle and a high performance, of which a magnification ratio is 9 times or more, and a half-field angle at a wide-angle end is 38 degrees or more, and to provide an information device which uses the zoom lens unit as a photographing optical system.

Especially, the present invention provides a zoom lens unit with a wide angle and a high magnification ratio, which is compact enough and has high performance such that aberrations are few, and for which cost is reduced and degree of freedom of selection of a glass material is improved.

At least another object of the present invention is to provide an information device with a photographing function including one of the zoom lens units mentioned above, as a photographing optical system.

The present invention proposes, for example, a zoom lens unit, including in order from an object side to an image side: a first lens group having a positive refracting power; a second lens group having a negative refracting power; a third lens group having a positive refracting power; and a fourth lens group having a positive refracting power, an aperture stop being disposed on an object side of the third lens group, and when changing magnification from a wide-angle end to a telephoto end, all the lens groups are moved, and an interval between the first lens group and the second lens group increases, an interval between the second lens group and the third lens group decreases, and an interval between the third lens group and the fourth lens group increases, wherein the third lens group has at least two positive lenses and one negative lens, wherein all the positive lenses of the third lens group satisfy the following formula:

$$-0.005865 v_{d3p} + 0.93226 < \theta_{gF3p} < -0.005865 v_{d3p} + 0.95226 \tag{1}$$

where, $v_{d3p}$ represents an Abbe number of each of the positive lenses of the third lens group, and $\theta_{gF3p}$ represents a partial dispersion ratio of each of the positive lenses of the third lens group which is defined by the formula: $\theta_{gF3p} = (n_g - n_F)/(n_F - n_C)$, $n_g$, $n_F$ and $n_C$ representing refractive indexes for g line, F line and C line, respectively.

The present invention further proposes, for example, an information device with a photographing function which uses the above-mentioned zoom lens unit as a photographing optical system.

BRIEF DESCRIPTION OF THE DRAWINGS

The invention will be described further below with reference to embodiments and the accompanying schematic drawings, in which:

FIG. 1A is a sectional view along an optical axis at a wide-angle end, FIG. 1B is a sectional view along the optical axis at a position of an intermediate focal length, and FIG. 1C is a sectional view along the optical axis at a telephoto end;

FIG. 5A is a sectional view along an optical axis at a wide-angle end, FIG. 5B is a sectional view along the optical axis at a position of an intermediate focal length, and FIG. 5C is a sectional view along the optical axis at a telephoto end;

FIG. 9A is a sectional view along an optical axis at a wide-angle end, FIG. 9B is a sectional view along the optical axis at a position of an intermediate focal length, and FIG. 9C is a sectional view along the optical axis at a telephoto end;

FIG. 10 is a view illustrating aberration diagrams of spherical aberration, astigmatism, distortion and comatic aberration at the wide-angle end of the zoom lens unit of Example 3 illustrated in FIGS. 9A to 9C;

FIG. 11 is a view illustrating aberration diagrams of spherical aberration, astigmatism, distortion and comatic aberration at the position of the intermediate focal length of the zoom lens unit of Example 3 illustrated in FIGS. 9A to 9C;

FIG. 13A is a sectional view along an optical axis at a wide-angle end, FIG. 13B is a sectional view along the optical axis at a position of an intermediate focal length, and FIG. 13C is a sectional view along the optical axis at a telephoto end;

FIG. 17A is a sectional view along an optical axis at a wide-angle end, FIG. 17B is a sectional view along the optical axis at a position of an intermediate focal length, and FIG. 17C is a sectional view along the optical axis at a telephoto end;

FIG. 21A is a sectional view along an optical axis at a wide-angle end, FIG. 21B is a sectional view along the optical axis at a position of an intermediate focal length, and FIG. 21C is a sectional view along the optical axis at a telephoto end;

FIG. 22 is a view illustrating aberration diagrams of spherical aberration, astigmatism, distortion and comatic aberration at the wide-angle end of the zoom lens unit of Example 6 illustrated in FIGS. 21A to 21C;

FIG. 23 is a view illustrating aberration diagrams of spherical aberration, astigmatism, distortion and comatic aberration at the position of the intermediate focal length of the zoom lens unit of Example 6 illustrated in FIGS. 21A to 21C;

DETAILED DESCRIPTION OF THE PREFERRED EMBODIMENTS

Hereinafter, embodiments of a zoom lens unit and an information device according to the present invention will be explained in detail, with reference of FIGS. 1A to 26.

First, a principled embodiment of the present invention will be explained.

A zoom lens unit according to an embodiment of the present invention, includes, in order from an object side to an image side: a first lens group having a positive refracting power; a second lens group having a negative refracting power; a third lens group having a positive refracting power; and a fourth lens group having a positive refracting power, an aperture stop being disposed on an object side of the third lens group, and when changing magnification from a wide-angle end to a telephoto end, all the lens groups are moved, an interval between the first lens group and the second lens group increases, an interval between the second lens group and the third lens group decreases, and an interval between the third lens group and the fourth lens group increases, the third lens group including at least two positive lenses and one negative lens, and it is preferable that all the positive lenses of the third lens group satisfy the following formula:

$$-0.005865\nu_{d3p}+0.93226 < \theta_{gF3p} < -0.005865\nu_{d3p}+0.95226 \quad (1)$$

where, $\nu_{d3p}$ represents an Abbe number of each of the positive lenses of the third lens group, and $\theta_{gF3p}$ represents a partial dispersion ratio of each of the positive lenses of the third lens group which is defined by the formula: $\theta_{gF3p}=(n_g-n_F)/(n_F-n_C)$, $n_g$, $n_F$ and $n_C$ representing refractive indexes for g line, F line and C line, respectively.

Here, the formula (1) defines the partial dispersion ratio of the positive lens of the third lens group.

Figure 25:
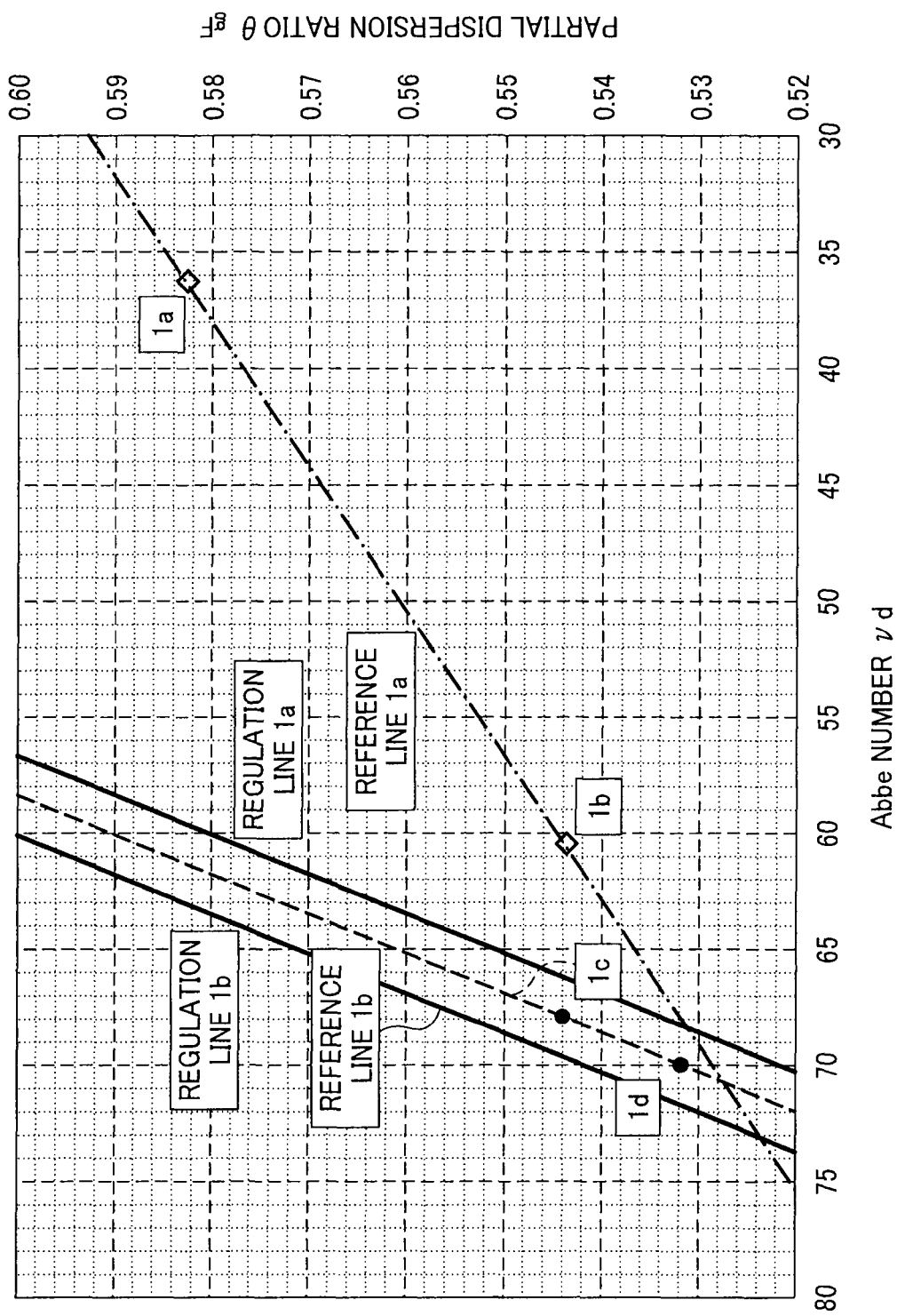
FIG. 25 is a graph illustrating a relationship between an Abbe number and a partial dispersion ratio of glass materials according to embodiments (examples) of the present invention.

FIG. 25 illustrates a relationship between an Abbe number, $\nu_d$, and a partial dispersion ratio, $\theta_{gF}$.

In FIG. 25, a "point $1a$" ($\nu_d$=36.26, $\theta_{gF}$=0.5828) represents glass made by OHARA INC. (Japan), having a trade name of PBM2, a "point $1b$" ($\nu_d$=60.49, $\theta_{gF}$=0.5436) represents glass made by OHARA INC. (Japan), having a trade name of NSL7, a "point $1c$" ($\nu_d$=67.9, $\theta_{gF}$=0.5440) represents glass made by HIKARI GLASS Co., Ltd. (Japan), having a trade name of EPSKH1, and a "point $1d$" ($\nu_d$=69.98, $\theta_{gF}$=0.5318) represents glass made by HIKARI GLASS Co., Ltd., having a trade name of EPKH1.

If a line connecting the "point $1a$" and the "point $1b$" is set as a "reference line $1a$", as a distribution of optical glass, roughly, high dispersion glass which has an Abbe number $\nu_d$ smaller than about 35 locates on an upper side of the "reference line $1a$", and most low dispersion glass which has an Abbe number $\nu_d$ between about 35 and about 65 locates on a lower side of the "reference line $1a$". In addition, at a position where an Abbe number $\nu_d$ is 60 or more and on the upper side of the "reference line $1a$", anomalous dispersion glass exists. Especially, in anomalous dispersion glass, if a line connecting the "point $1c$" and the "point $1d$" is set as a "reference line $1b$", neighboring glass has a relatively large Abbe number and a large anomalous dispersion.

By using this kind of material for the positive lens of the third lens group, in the zoom lens unit which is compact and has a wide angle and a high magnification ratio, reduction of the chromatic aberration of magnification at the telephoto end and degradation of MTF can be achieved.

In FIG. 25, a "regulation line $1a$" is defined by $\theta_{gF3p}=-0.005865\nu_{d3p}+0.93226$, and a "regulation line $1b$" is defined by $\theta_{gF3p}=-0.005865\nu_{d3p}+0.95226$. Both of the lines have the same slope as the "reference line $1b$".

If glass which locates at a position on a lower side than a lower limit, i.e., on a lower side than the "regulation line $1a$" is used, the secondary spectrum of the chromatic aberration of magnification at the telephoto end can not be corrected sufficiently and leads to the deterioration of MTF, due to the Abbe number being small or the anomalous dispersibility being insufficient. If glass which locates at a position on an upper side than an upper limit, i.e., on an upper side than the "regulation line $1b$" is used, correction ability of the chromatic aberration of magnification increases, while due to the refractive power of the positive lens becoming weak, the effect of correcting a Petzval sum to a positive side decreases, a curvature of field grows, and the performance deteriorates.

Further, it is preferable that the following formula be satisfied:

$$-0.005865\nu_{d3p}+0.94026 < \theta_{gF3p} < -0.005865\nu_{d3p}+0.95226 \quad (1')$$

To obtain a high performance, it is preferable that the zoom lens unit satisfy the following formula:

$$0.15 < n_{nave} - n_{pave} < 0.40 \quad (2)$$

where, $n_{nave}$ represents an average refractive index of all the negative lenses of the third lens group, and $n_{pave}$ represents an average refractive index of all the positive lenses of the third lens group.

Here, the formula (2) is a conditional expression which defines a difference between the refractive index of the positive lens of the third lens group and the refractive index of the negative lens of the third lens group. If the difference "$n_{nave}-n_{pave}$" exceeds the upper limit or the lower limit, the effect of correcting the Petzval sum to the positive side or a negative side becomes too strong, and the curvature of field grows, and thus the performance deteriorates.

In addition, it is preferable that the following formula be satisfied:

$$0.17 < n_{nave} - n_{pave} < 0.37 \quad (2')$$

Effect of corrections of both the secondary spectrum and the curvature of field can be obtained, by satisfying the formulae (1) and (2), and preferably the formulae (1') and (2') simultaneously.

To obtain a high performance, it is preferable that the third lens group include at least, in order from the object, a positive lens, a positive lens and a negative lens.

To attain further compactness, it is preferable that the third lens group include two positive lenses and one negative lens.

To obtain a further high performance, it is preferable that the second lens group include, in order from the object side, a negative lens, a positive lens and a negative lens.

In the second lens group, by arranging two negative lenses to share a negative power of the second lens group and thus aberrations are easy to be reduced, and by arranging in order from the object side the negative lens, the positive lens and the negative lens, a symmetry of the lens construction is improved, and the second lens group is constructed such that the aberrations can be efficiently corrected in the second lens group.

In the above-mentioned zoom lens unit, it is preferable that the following formula be satisfied:

$$1.0 < Tpr < 1.5 \quad (3)$$

where, Tpr represents a telephoto ratio obtained by dividing a total length of the entire zoom lens unit system at the telephoto end by a focal length of the entire zoom lens unit system at the telephoto end.

Here the formula (3) is a condition to regulate an extension amount of the first lens group, which is important for a wide angle and great telephoto and compactness of the zoom lens unit, and to make a sufficient aberration correction possible.

If the telephoto ratio, Tpr, is 1.5 or more, the extension amount of the first lens group becomes large, therefore, it not only brings disadvantages to the compactness of the zoom lens unit, but also results in the radial direction grows in size for securing the light volume around at the telephoto end, and the image performance is also easily deteriorated by the manufacturing error such as the falling of lens barrel.

In addition, if the telephoto ratio, Tpr, is less than 1.0, a displacement of the first lens group becomes small, the contribution to the changing magnification of the second lens group decreases, and the burden of the third lens group increases, or the refracting power of the second lens group has to be strengthened, resulting in the deterioration in various aberrations in either case.

To obtain a higher performance, it is preferable to provide a hybrid aspheric surface to at least one negative lens of the second lens group.

Here, the hybrid aspheric lens is made by forming a thin film made of a resin material on a glass spherical lens and making its surface to be an aspherical surface. With this hybrid aspheric lens, not only the high performance can be obtained, also glass materials can be selected freely, and low cost is possible.

Further, to obtain a higher performance, it is preferable that the first lens group include one negative lens and two positive lenses.

Moreover, it is preferable that a surface nearest to the image side be an aspheric surface.

To obtain a higher performance, it is preferable that a lens nearest to the object side, of the third lens group, has an aspheric surface. In addition, it is preferable that the lens nearest to the object side, of the third lens group, be a double-sided aspheric lens. By this, various aberrations can be corrected, and a higher performance can be obtained.

Further, to obtain a high performance, it is preferable that the fourth lens group include at least one positive lens, and a surface nearest to the object side be an aspheric surface. By providing the aspheric lens to the surface nearest to the object side, of the fourth lens group, effect on image plane correction by the aspheric surface can be obtained greatly due to light on the axis being away.

In addition, it is preferable that the following formula (4) be satisfied:

$$\theta_{gF} < 0.551 \qquad (4)$$

where, $\theta_{gF}$ represents a partial dispersion ratio of the positive lens of the fourth lens group, $(n_g - n_F)/(n_F - n_C)$.

If the parameter, $\theta_{gF}$, exceeds the upper limit of the formula (4), chromatic aberration especially on the telephoto side becomes large, and it causes disadvantages for the aberration correction.

Further, it is preferable that plastic be used as the material, as it is favorable in terms of the cost.

Moreover, in the above-mentioned zoom lens unit, it is preferable that the following formula (5) be satisfied:

$$Ft/Fw > 9 \qquad (5)$$

where, Fw and Ft represent focal lengths of the optical system at the wide-angle end and the telephoto end respectively.

Here, the formula (5) regulates a zoom ratio. It is desirable that the zoom ratio be 9 times or more, and it is especially preferable that the zoom ratio be 10 to 11 times, which can provide a compact zoom lens unit with a high performance.

In addition, in the above-mentioned zoom lens unit, it is preferable that the following formula (6) be satisfied:

$$0.78 < Y'/Fw \qquad (6)$$

where, Y' represents a maximum image height, and Fw represents the focal length at the wide-angle end.

Here, the formula (6) regulates a field angle, and a compact zoom lens unit with a high performance, which has a half-field angle of 38 degrees or more at the wide-angle end and high magnification ratio can be provided.

In the above-mentioned zoom lens unit, it is preferable that when changing magnification from the wide-angle end to the telephoto end, all the lens groups be moved; that is, the first and the third lens groups be moved to the object side, the second lens group be moved to the image side with a convex curve or a part of the convex curve, the fourth lens group be moved to the object side with a convex curve or a part of the convex curve, and the aperture stop be moved independently of each lens group.

With this structure, the displacement of the first lens group can be decreased efficiently, and it is favorable in terms of the aberration correction.

In addition, when focusing to a finite distance, a method which moves only the fourth lens group is preferable because "a weight of an object to be moved" is minimum. In order to simplify the mechanism, it is better for the opening diameter of the aperture stop to be constant regardless of the changing magnification. However, the change in F number can be reduced by increasing the opening diameter at the telephoto end with respect to the wide-angle end. In addition, if it is necessary to reduce the light volume which reaches the image plane, the diameter of the aperture stop can be reduced. However, it is preferable to insert an ND filter and the like without significantly changing the diameter of the aperture stop so as to reduce the light volume because the resolution deterioration by a diffraction phenomenon can be prevented.

An information device according to the present invention has a photographing function which includes any one of the above-mentioned zoom lens units as a photographing optical system. The information device can be configured such that an object image by the zoom lens unit is formed onto a light receiving plane of an imaging element. As above-mentioned, the information device can be constituted as a digital camera, or a video camera or a silver salt camera or the like, and it is preferable that the information device be constituted as a portable information device.

Since the zoom lens unit according to the present invention is formed with the above-mentioned structure, a zoom lens unit having a sufficient wide field angle in which a half-field angle at the wide-angle end is 38 degrees or more, and having a magnification ratio of 9 times or more, and in which aberrations are corrected sufficiently, and being compact, and having a resolution corresponding to an imaging element with high resolution can be obtained; and thus, a compact information device with high performance can be obtained, by using the zoom lens unit as a photographing optical system.

Specific examples will be explained in detail, based on the above-mentioned embodiments of the present invention.

Examples 1 to 6 explained hereinafter are examples with specific structures by specific numerical examples of a zoom lens unit according to an embodiment of the present invention.

In each of Examples 1 to 6, an optical component consisting of a parallel plate disposed on the image side of the fourth lens group is assumed to be various filters such as optical low-pass filters and infrared rays cutting filters, or a cover glass (seal glass) of an imaging element such as CCD sensors, and is represented by various filters FM here. In addition, "mm" is used as a unit of the length, unless otherwise noted.

In addition, in each of Examples 1 to 6, several lens surfaces are formed to be aspheric surfaces. The aspheric surface can be formed by forming each lens surface to be an aspheric surface directly, like a so-called molding aspheric lens, or can be formed by applying a resin thin film that forms an aspheric surface to a lens surface of a spherical lens to obtain an aspheric surface, like a so-called hybrid aspheric lens.

Since aberrations in each of Examples 1 to 6 are corrected sufficiently, the zoom lens unit can correspond to a light receiving element having 5 to 10 million pixels or more. Therefore, Examples 1 to 6 make it clear that, by constructing a zoom lens unit according to the present invention, an excellent image performance can be secured while achieving sufficient compactness.

Meanings of signs in Examples 1 to 6 are as follows:
f: focal length of an entire zoom lens unit system
F: F-number (F value)
ω: half-field angle (degree)
R: curvature radius (paraxial curvature radius for an aspheric surface)
D: surface distance
nd: refractive index
vd: Abbe number
K: Cone constant number of aspheric surface
$A_4$: Aspheric surface coefficient of 4-order
$A_6$: Aspheric surface coefficient of 6-order
$A_8$: Aspheric surface coefficient of 8-order
$A_{10}$: Aspheric surface coefficient of 10-order
$A_{12}$: Aspheric surface coefficient of 12-order
$A_{14}$: Aspheric surface coefficient of 14-order The aspheric surface shape used here is defined by the following formula (A), using an inverse number of paraxial curvature radius (paraxial curvature), C, a height from the optical axis, H, a cone constant number, K, and each of the aspheric surface coefficients of high-order, and adopting an aspheric surface amount in the optical axis direction as X, the shape is specified by providing the paraxial curvature radius, the cone constant number, and the aspheric surface coefficients.

$$X = CH^2/\{1+\sqrt{(1-(1+K)C^2H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} \quad \text{(A)}$$

Example 1

Figure 1A:
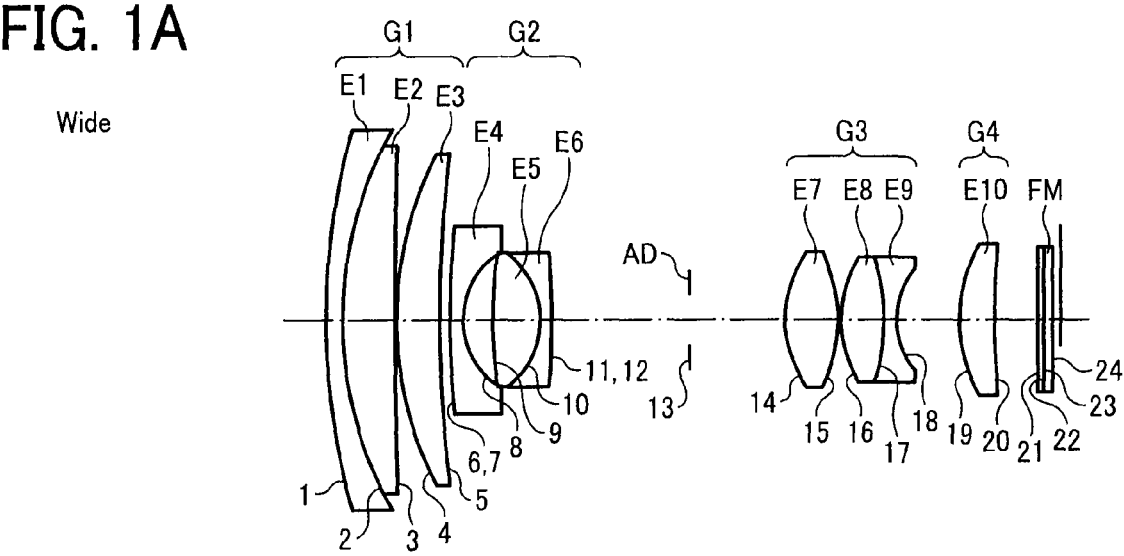
FIGS. 1A to 1C are views schematically illustrating structures of an optical system of a zoom lens unit according to Example 1 of the present invention and zoom trajectories when zooming, where.
Figure 1B:
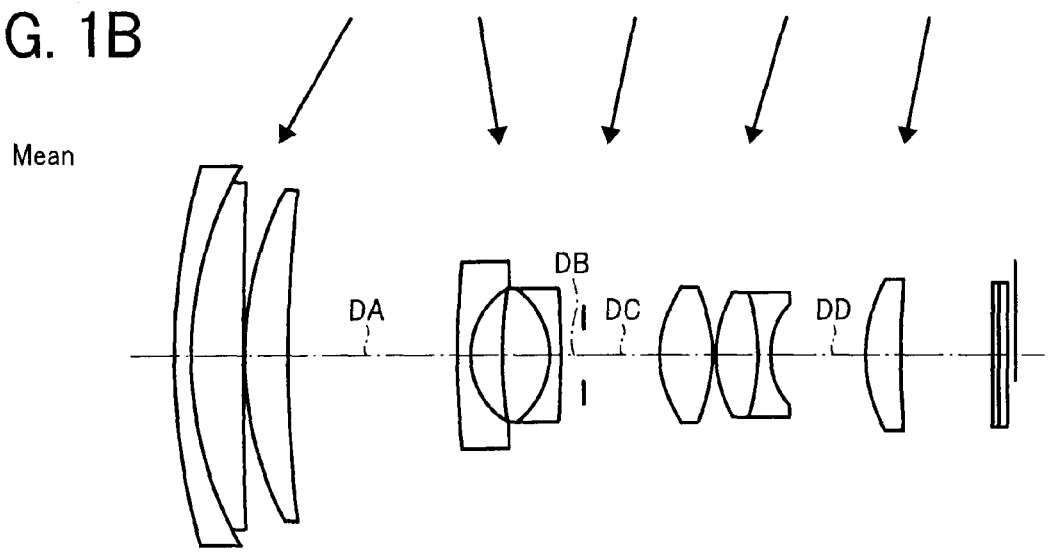
Figure 1C:
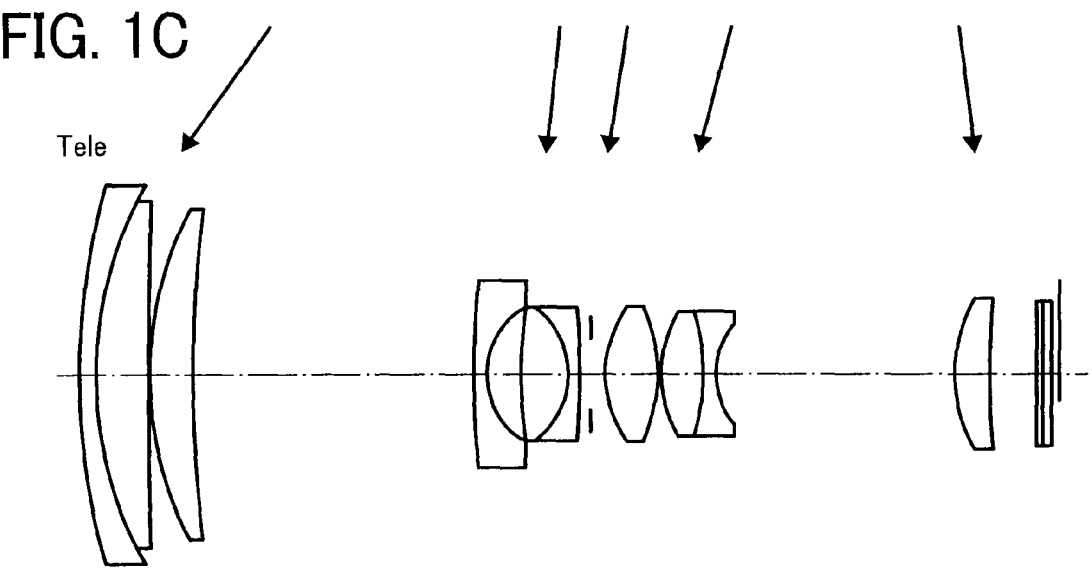

FIGS. 1A to 1C are views schematically illustrating structures of lenses, and zoom trajectories when zooming from a wide-angle end to a telephoto end, through a predetermined intermediate focal length, of a zoom lens unit according to Example 1 of the present invention, where, FIG. 1A is a sectional view at the wide-angle end (Wide), FIG. 1B is a sectional view at the predetermined intermediate focal length (Mean), and FIG. 1C is a sectional view at the telephoto end (Tele). In FIGS. 1A to 1C illustrating arrangements of the lens groups of Example 1, the left side is an object side.

A zoom lens unit illustrated in FIGS. 1A to 1C includes, along an optical axis, in order from the object side to an image side, a first lens group G1 having a positive refracting power; a second lens group G2 having a negative refracting power; a third lens group G3 having a positive refracting power; and a fourth lens group G4 having a positive refracting power, an aperture stop AD being disposed between the second lens group G2 and the third lens group G3. In this case, the first lens group G1 has a first lens E1, a second lens E2, and a third lens E3. The second lens group G2 has a fourth lens E4, a fifth lens E5, and a sixth lens E6. The third lens group G3 has a seventh lens E7, an eighth lens E8, and a ninth lens E9. The fourth lens group G4 has a tenth lens E10.

Each of the first lens group G1 to the fourth lens group G4 is supported per group by a common support frame or the like, and operates integrally per group when zooming and so on is carried out, the aperture stop AD operates independently of each lens group. In addition, surface numbers r1 to r24 of each optical surface are also illustrated in FIGS. 1A to 1C.

Here, to avoid making the explanation complicated by increment of the digit number of reference numerals, each reference for FIGS. 1A to 1C is used independently in each of the examples; therefore, even if a common reference numeral in a figure illustrating another example is used in FIGS. 1A to 1C, it is not necessary that the corresponding structure be the same as the structure in the other example.

When changing magnification from the wide-angle end (a short focal length end) to the telephoto end (a long focal length end), the first lens group G1 to the fourth lens group G4 are moved, and an interval between the first lens group G1 and the second lens group G2 increases, an interval between the second lens group G2 and the third lens group G3 decreases, and an interval between the third lens group G3 and the fourth lens group G4 increases.

The first lens group G1 includes, in order from the object side, the first lens E1 consisting of a negative meniscus lens having a convex surface toward the object side, the second lens E2 consisting of a positive meniscus lens having a convex surface toward the object side, and the third lens E3 consisting of a positive meniscus lens having a convex surface toward the object side. The first lens E1 and the second lens E2 are in close contact with each other and are joined together to form a cemented lens (including two lenses).

The second lens group G2 includes, in order from the object side, the fourth lens E4 which is a negative meniscus lens having a convex surface toward the object side, consisting of an aspheric lens having an aspheric surface formed by applying a resin layer to its surface on the object side (a hybrid aspheric lens), the fifth lens E5 consisting of a biconvex positive lens including a stronger convex surface toward the image side, and the sixth lens E6 which is a negative meniscus lens having a convex surface toward the image side, consisting of a hybrid aspheric lens having an aspheric surface formed by applying a resin material to its surface on the image side. The fifth lens E5 and the sixth lens E6 are in close contact with each other and are joined together to form a cemented lens (including two lenses).

The aperture stop AD is disposed between the second lens group G2 and the third lens group G3.

The third lens group G3 includes, in order from the object side, the seventh lens E7 consisting of a positive lens having two aspheric surfaces and with a biconvex shape in which a stronger convex surface toward the object side, the eighth lens E8 consisting of a biconvex positive lens having a stronger convex surface toward the object side, and the ninth lens E9 consisting of a biconcave negative lens having a stronger concave surface toward the image side. The eighth lens E8 and the ninth lens E9 are in close contact with each other and are joined together to form a cemented lens (including two lenses).

The fourth lens group G4 has only the tenth lens E10 consisting of a positive meniscus lens having a convex surface toward the object side and forming an aspheric surface on the object side.

In this case, as illustrated in FIGS. 1A to 1C, when changing magnification from the wide-angle end (the short focal length end) to the telephoto end (the long focal length end), the first lens group G1 and the third lens group G3 are moved from the image side to the object side monotonously, the second lens group G2 is moved to the image side with a convex trajectory, and the fourth lens group G4 is moved to the object side with a convex trajectory.

In Example 1, focal length of an entire zoom lens unit system, f, F-number, F, and a half-field angle, ω, change within ranges of, f=5.05-51.98, F=3.59-6.09, ω=39.3-4.54, respectively, in accordance with zooming.

Optical properties of each optical component are shown in the following table.

is the aspheric surface. Parameters in the formula (A) of each aspheric surface are represented in the following table.

Aspherical Surface Parameters

Sixth Surface $K=0, A_4=1.77332\times10^{-4}, A_6=-9.72325\times10^{-6}, A_8=6.90805\times10^{-7}, A_{10}=-2.97854\times10^{-8}, A_{12}=6.25272\times10^{-10}, A_{14}=-5.22888\times10^{-12}$ Twelfth Surface $K=0, A_4=-7.64112\times10^{-4}, A_6=2.16009\times10^{-6}, A_8=-1.12969\times10^{-6}, A_{10}=-1.24137\times10^{-8}$ Fourteenth Surface $K=0, A_4=-8.06209\times10^{-4}, A_6=1.09740\times10^{-5}, A_8=-7.54712\times10^{-7}, A_{10}=1.12131\times10^{-8}, A_{12}=2.76518\times10^{-11}$ Fifteenth Surface $K=0, A_4=4.55902\times10^{-4}, A_6=9.25284\times10^{-6}, A_8=-9.40053\times10^{-8}$

TABLE 1 f = 5.05-51.98, F = 3.59-6.09, ω = 39.3-4.54

| Surface No. | R | D | nd | vd | Glass | | Remarks | |
|---|---|---|---|---|---|---|---|---|
| 1 | 43.7504 | 1.035 | | | | | | G1 |
| | | | 2.00069 | 25.46 | HOYA | TAFD40 | E1 | |
| 2 | 23.8077 | 3.35862 | | | | | | |
| | | | 1.603 | 65.44 | OHARA | SPHM53 | E2 | |
| 3 | 417.207 | 0.1 | | | | | | |
| 4 | 22.476 | 2.71731 | | | | | | |
| | | | 1.7725 | 49.6 | OHARA | SLAH66 | E3 | |
| 5 | 87.0845 | Variable DA | | | | | | |
| 6* | 90.8892 | 0.04 | 1.5202 | 52.02 | | Resin layer | E4 | G2 |
| 7 | 61.9212 | 0.8 | | | | | | |
| | | | 2.0033 | 28.27 | OHARA | SLAH79 | | |
| 8 | 4.84886 | 1.84814 | | | | | | |
| 9 | 25.7749 | 3.05576 | | | | | | |
| | | | 1.84666 | 23.78 | OHARA | STIH53 | E5 | |
| 10 | -5.2676 | 0.7 | | | | | E6 | |
| | | | 1.883 | 40.76 | OHARA | SLAH58 | | |
| 11 | -61.351 | 0.04 | | | | | | |
| 12* | 100.15 | Variable DB | 1.5202 | 52.02 | | Resin layer | | |
| 13 | ∞ | Variable DC | | | | Aperture Stop | AD | |
| 14* | 6.24807 | 3.35949 | | | | | | G3 |
| | | | 1.48749 | 70.24 | OHARA | SFSL5 | $\theta_{gF}=$ 0.53 | E7 |
| 15* | -8.3239 | 0.19375 | | | | | | |
| 16 | 7.34842 | 2.63755 | | | | | | |
| | | | 1.5924 | 68.3 | SUMITA | KGFK68 | $\theta_{gF}=$ 0.546 | E8 |
| 17 | -13.426 | 0.8 | | | | | | |
| 18 | 4.80907 | Variable DD | 1.90366 | 31.32 | HOYA | TAFD25 | E9 | |
| 19* | 9.55516 | 2.23916 | | | | | | G4 |
| | | | 1.51633 | 64.06 | OHARA | LBSL7 | E10 | |
| 20 | 82.1926 | | | | | | | |
| 21 | ∞ | 0.3 | | | | | FM | |
| | | | 1.5168 | 64.2 | | | | |
| 22 | ∞ | 0.1 | | | | | | |
| 23 | ∞ | 0.5 | | | | | | |
| | | | 1.5 | 64 | | | | |
| 24 | ∞ | — | | | | | | |

In Table 1, a lens surface of which the surface number is shown with an "*(asterisk)" is an aspheric surface, and ahead of a glass name, names of manufacturers of HOYA Co., Ltd. (Japan), OHARA INC. (Japan), SUMITA OPTICAL GLASS, INC. (Japan), and HIKARI GLASS Co., Ltd. (Japan), have been abbreviated to HOYA, OHARA, SUMITA and HIKARI respectively. They are similar in other examples.

Namely, in Table 1, each optical surface of the sixth surface, the twelfth surface, the fourteenth surface, the fifteenth surface and the nineteenth surface shown with an asterisk "*"

Nineteenth Surface $K=0, A_4=-4.47303\times10^{-5}, A_6=3.64467\times10^{-6}, A_8=-5.98158\times10^{-8}$ The variable distance DA between the first lens group G1 and the second lens group G2, the variable distance DB between the second lens group G2 and the aperture stop AD, the variable distance DC between the aperture stop AD and the third lens group G3, and the variable distance DD between the third lens group G3 and the fourth lens group G4 are varied in accordance with zooming, as represented in the following table.

TABLE 2

| | Wide-angle end | Intermediate focal length | Telephoto end |
|---|---|---|---|
| f | 5.05 | 16.20 | 51.98 |
| D A | 0.640 | 10.784 | 17.944 |
| D B | 8.774 | 1.566 | 0.800 |
| D C | 6.215 | 4.903 | 0.950 |
| D D | 4.006 | 6.046 | 15.200 |

Figure 26:
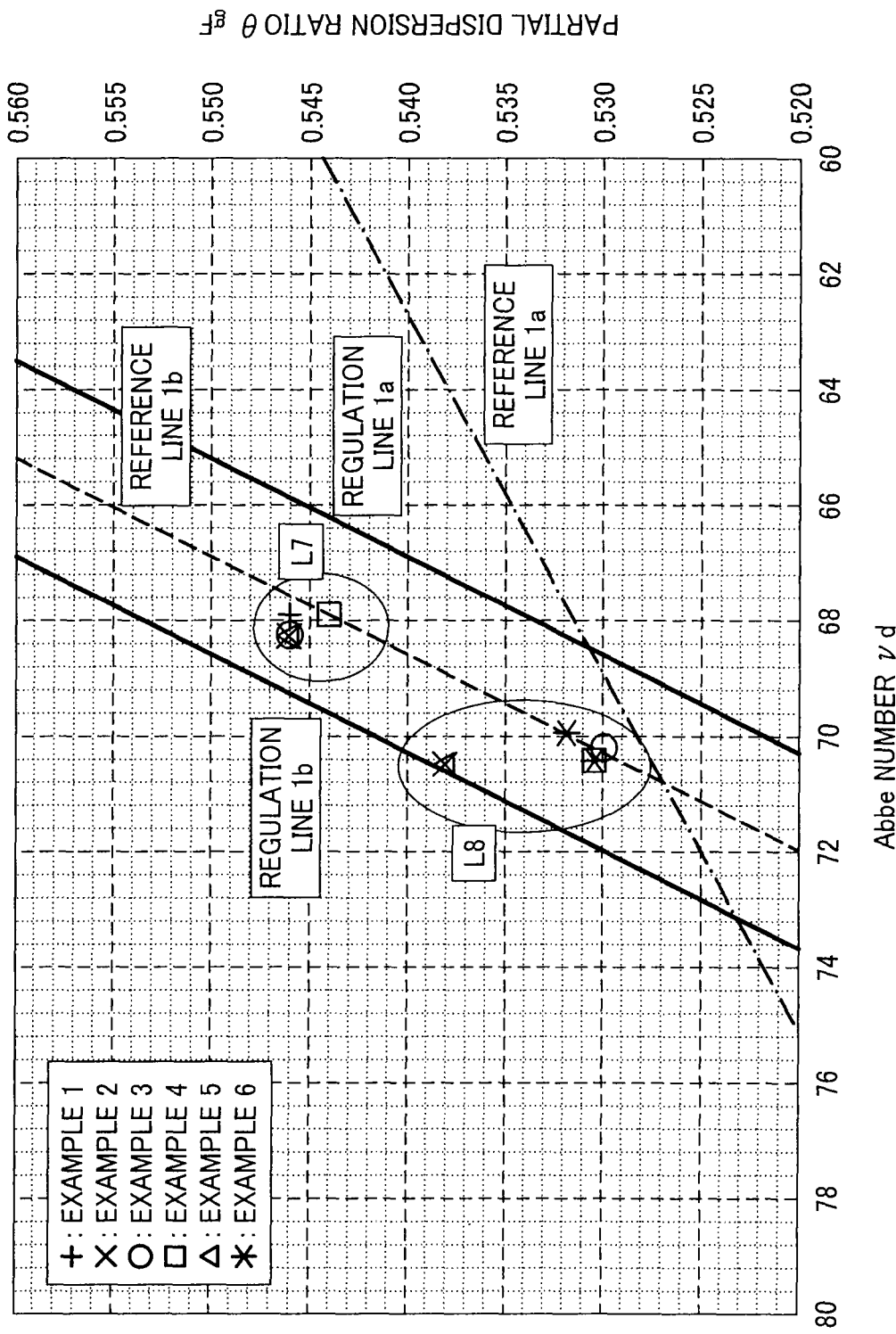
FIG. 26 is a graph illustrating a relationship between an Abbe number and a partial dispersion ratio, which explains that glass (glass material) used in a positive lens of a third lens group of Examples 1 to 6 of the present invention is included in a range from a lower limit regulation line to an upper limit regulation line.

Variable Distance (1) Glass used for the positive lens of the third lens group G3 of Example 1 is included in a range defined by the "regulation line 1a" and the "regulation line 1b" which are defined by the formula (1), as illustrated in FIG. 26.

In addition, values corresponding to the formulae (2) to (6) are as follows:

$$n_{nave} - n_{pave} = 0.364 \qquad (2)$$

$$Tpr = 1.198 \qquad (3)$$

$$\theta_{gF} = 0.532 \qquad (4)$$

$$Ft/Fw = 10.303 \qquad (5)$$

$$Y'/Fw = 0.819 \qquad (6)$$

The values satisfy the formulae (2) to (6) respectively.

Figure 2:
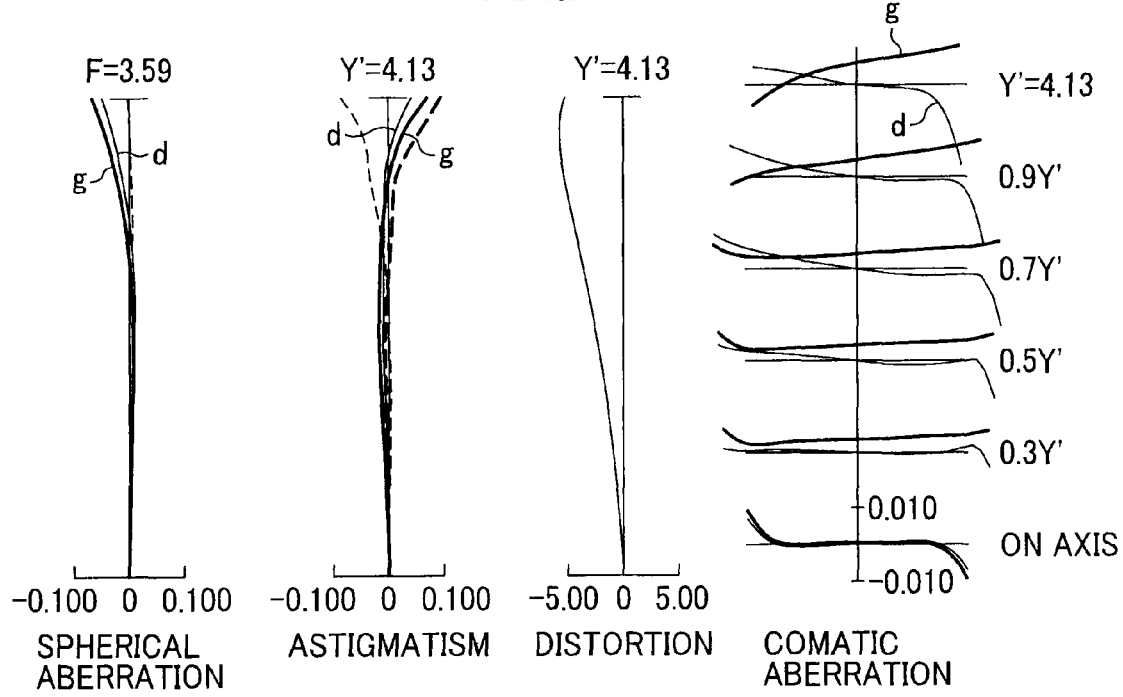
FIG. 2 is a view illustrating aberration diagrams of spherical aberration, astigmatism, distortion and comatic aberration at the wide-angle end of the zoom lens unit of Example 1 illustrated in FIGS. 1A to 1C.
Figure 3:
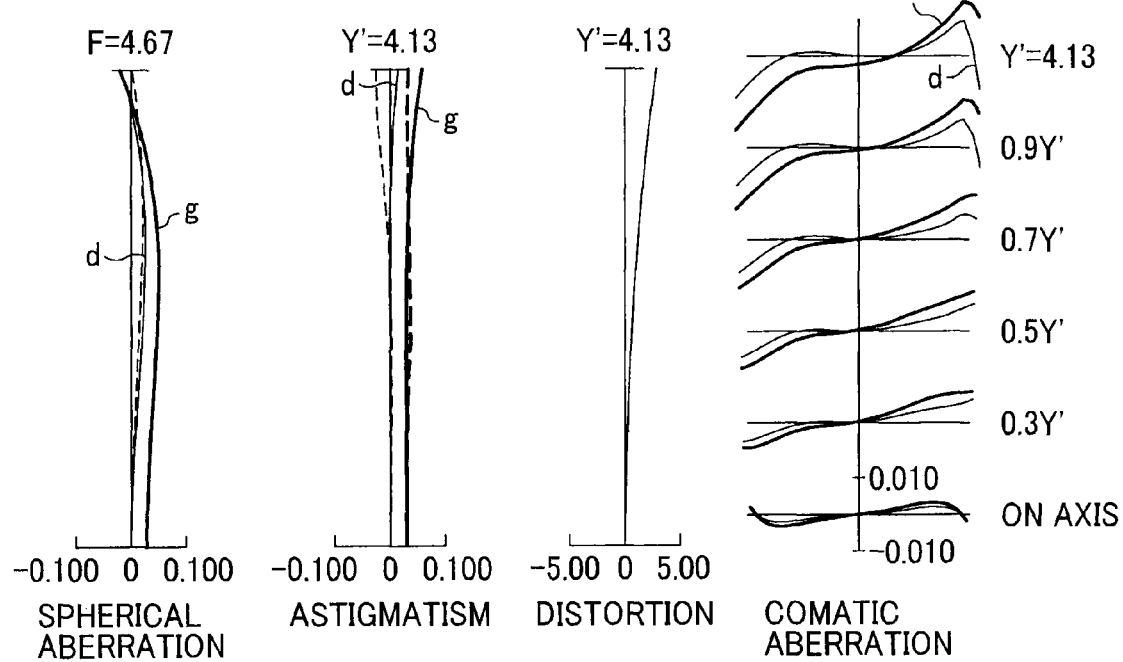
FIG. 3 is a view illustrating aberration diagrams of spherical aberration, astigmatism, distortion and comatic aberration at the position of the intermediate focal length of the zoom lens unit of Example 1 illustrated in FIGS. 1A to 1C.
Figure 4:
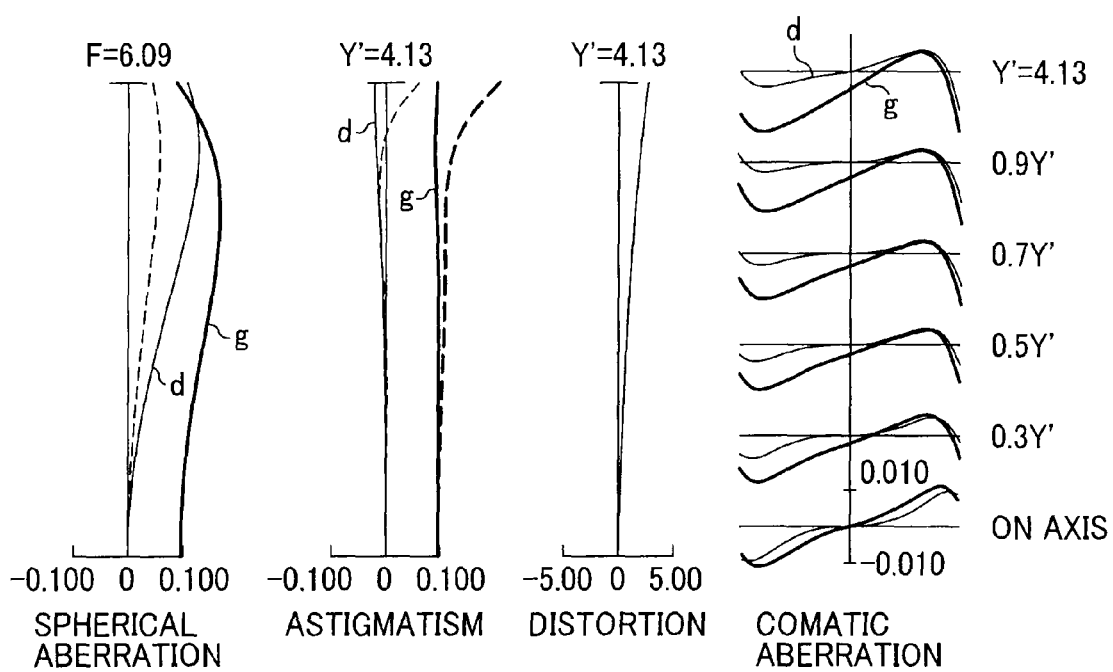
FIG. 4 is a view illustrating aberration diagrams of spherical aberration, astigmatism, distortion and comatic aberration at the telephoto end of the zoom lens unit of Example 1 illustrated in FIGS. 1A to 1C.

In addition, FIGS. 2 to 4 illustrate aberration diagrams of each aberration of spherical aberration, astigmatism, distortion and comatic aberration at the wide-angle end, at the intermediate focal length, and at the telephoto end, of Example 1, respectively. In the aberration diagrams, the dashed lines in the spherical aberration diagram illustrate sine condition, the solid lines in the astigmatic diagram illustrate sagittal, and the dashed lines in the astigmatic diagram illustrate meridional. In addition, "g" and "d" in each aberration diagram of spherical aberration and astigmatism and comatic aberration represent "g line" and "d line" respectively. They are similar in aberration diagrams of other examples.

Example 2

Figure 5A:
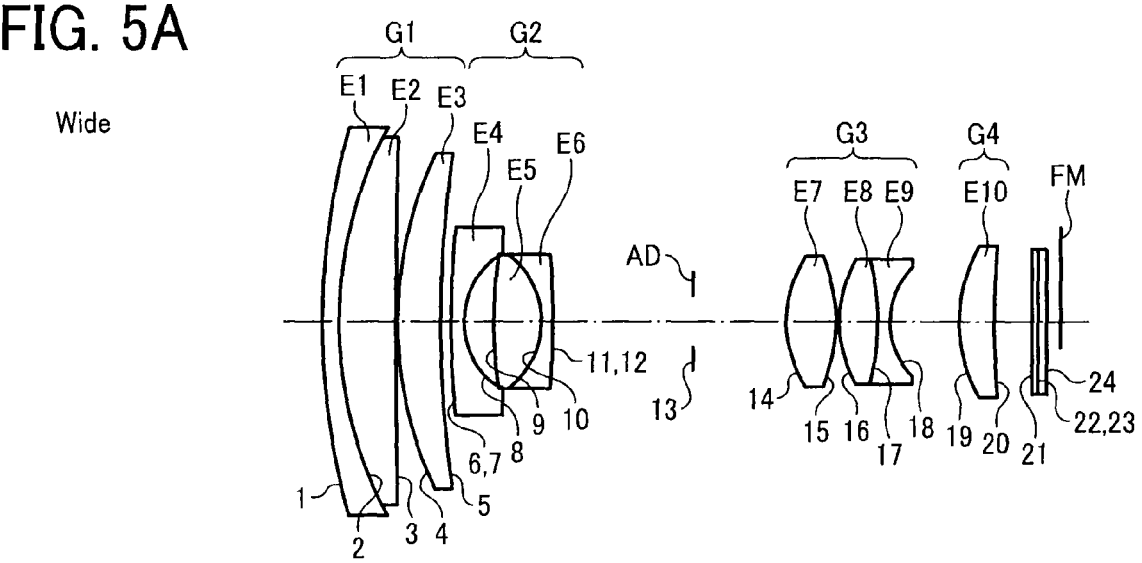
FIGS. 5A to 5C are views schematically illustrating structures of an optical system of a zoom lens unit according to Example 2 of the present invention and zoom trajectories when zooming, where.
Figure 5B:
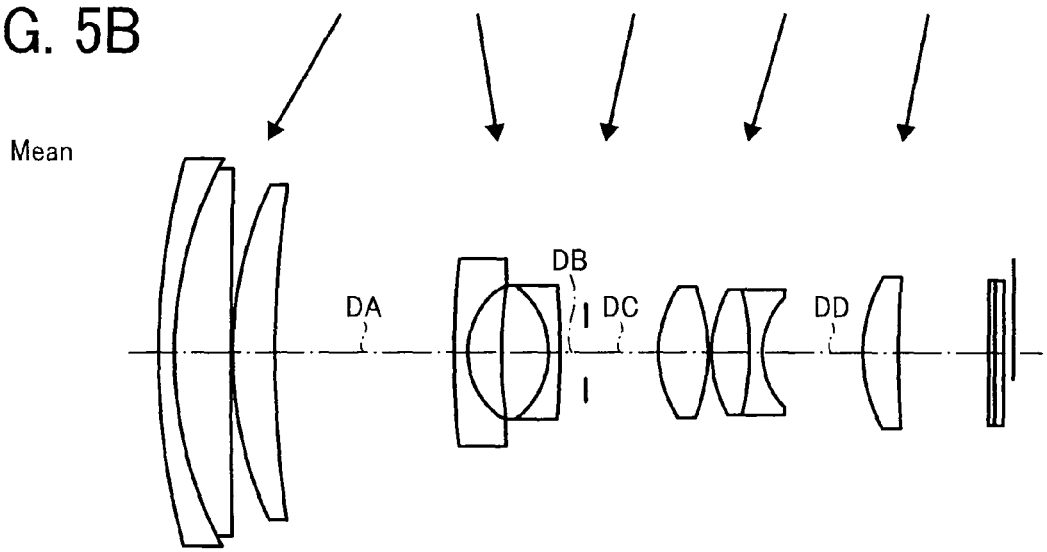
Figure 5C:
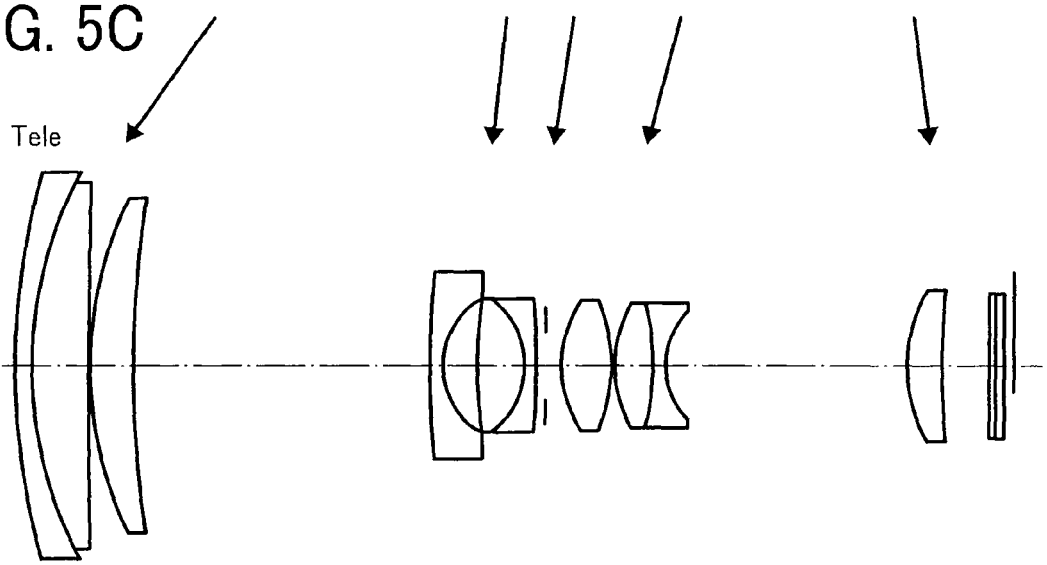

FIGS. 5A to 5C are views schematically illustrating structures of lenses, and zoom trajectories when zooming from a wide-angle end to a telephoto end, through a predetermined intermediate focal length, of a zoom lens unit according to Example 2 of the present invention, where, FIG. 5A is a sectional view at the wide-angle end, FIG. 5B is a sectional view at the predetermined intermediate focal length, and FIG. 5C is a sectional view at the telephoto end. In FIGS. 5A to 5C illustrating arrangements of the lens groups of Example 2, the left side is an object side.

A zoom lens unit illustrated in FIGS. 5A to 5C includes, along an optical axis, in order from the object side to an image side, a first lens group G1 having a positive refracting power; a second lens group G2 having a negative refracting power; a third lens group G3 having a positive refracting power; and a fourth lens group G4 having a positive refracting power, an aperture stop AD being disposed between the second lens group G2 and the third lens group G3. In this case, the first lens group G1 has a first lens E1, a second lens E2, and a third lens E3. The second lens group G2 has a fourth lens E4, a fifth lens E5, and a sixth lens E6. The third lens group G3 has a seventh lens E7, an eighth lens E8, and a ninth lens E9. The fourth lens group G4 has a tenth lens E10.

Each of the first lens group G1 to the fourth lens group G4 is supported per group by a common support frame or the like, and operates integrally per group when zooming and so on is carried out, the aperture stop AD operates independently of each lens group. In addition, surface numbers of each optical surface are also illustrated in FIGS. 5A to 5C.

Here, to avoid making the explanation complicated by increment of the digit number of reference numerals, each reference for FIGS. 5A to 5C is used independently in each of the examples; therefore, even if a common reference numeral in a figure illustrating another example is used in FIGS. 5A to 5C, it is not necessary that the corresponding structure be the same as the structure in the other example.

When changing magnification from the wide-angle end to the telephoto end, the first lens group G1 to the fourth lens group G4 are moved, and an interval between the first lens group G1 and the second lens group G2 increases, an interval between the second lens group G2 and the third lens group G3 decreases, and an interval between the third lens group G3 and the fourth lens group G4 increases.

The first lens group G1 includes, in order from the object side, the first lens E1 consisting of a negative meniscus lens having a convex surface toward the object side, the second lens E2 consisting of a positive meniscus lens having a convex surface toward the object side, and the third lens E3 consisting of a positive meniscus lens having a convex surface toward the object side. The first lens E1 and the second lens E2 are in close contact with each other and are joined together to form a cemented lens (including two lenses).

The second lens group G2 includes, in order from the object side, the fourth lens E4 which is a negative meniscus lens having a convex surface toward the object side, consisting of a hybrid aspheric lens having an aspheric surface formed by applying a resin layer to its surface on the object side, the fifth lens E5 consisting of a biconvex positive lens including a stronger convex surface toward the image side, and the sixth lens E6 which is a negative meniscus lens having a convex surface toward the image side, consisting of an aspheric lens having an aspheric surface formed by applying a resin material to its surface on the image side. The fifth lens E5 and the sixth lens E6 are in close contact with each other and are joined together to form a cemented lens (including two lenses).

The aperture stop AD is disposed between the second lens group G2 and the third lens group G3.

The third lens group G3 includes, in order from the object side, the seventh lens E7 consisting of a positive lens having two aspheric surfaces and with a biconvex shape in which a stronger convex surface toward the object side, the eighth lens E3 consisting of a biconvex positive lens having a stronger convex surface toward the object side, and the ninth lens E9 consisting of a biconcave negative lens having a stronger concave surface toward the image side. The eighth lens E8 and the ninth lens E9 are in close contact with each other and are joined together to form a cemented lens (including two lenses).

The fourth lens group G4 has only the tenth lens E10 consisting of a positive meniscus lens having a convex surface toward the object side and forming an aspheric surface on the object side.

Namely, the zoom lens unit of Example 2 has a substantially similar structure to that of the above-mentioned Example 1.

In this case, as illustrated in FIGS. 5A to 5C, when changing magnification from the wide-angle end to the telephoto end, the first lens group G1 and the third lens group G3 are moved from the image side to the object side monotonously, the second lens group G2 is moved to the image side with a convex trajectory, and the fourth lens group G4 is moved to the object side with a convex trajectory.

In Example 2, focal length of an entire zoom lens unit system, f, F-number, F, and a half-field angle, ω, change within ranges of, f=5.05-51.98, F=3.61-6.15, ω=39.3-4.54, respectively, in accordance with zooming.

Optical properties of each optical component are shown in the following table.

Nineteenth Surface $K=0, A_4=-5.31816 \times 10^{-5}, A_6=3.63784 \times 10^{-6}, A_8=-6.17397 \times 10^{-8}$ The variable distance DA between the first lens group G1 and the second lens group G2, the variable distance DB between the second lens group G2 and the aperture stop AD, the variable distance DC between the aperture stop AD and the third lens group G3, and the variable distance DD between

TABLE 3 f = 5.05-51.98, F = 3.61-6.15, ω = 39.3-4.54

| Surface No. | R | D | nd | vd | Glass | | Remarks | | |
|---|---|---|---|---|---|---|---|---|---|
| 1 | 44.8899 | 1.035 | | | | | | | G1 |
| | | | 2.00069 | 25.46 | HOYA | TAFD40 | | E1 | |
| 2 | 24.5919 | 3.59405 | | | | | | | |
| | | | 1.603 | 65.44 | OHARA | SPHM53 | | E2 | |
| 3 | 461.586 | 0.1 | | | | | | | |
| 4 | 23.051 | 2.86197 | | | | | | | |
| | | | 1.7725 | 49.6 | OHARA | SLAH66 | | E3 | |
| 5 | 84.5224 | Variable DA | | | | | | | |
| 6* | 80.4367 | 0.04 | 1.5202 | 52.02 | | | Resin layer | E4 | G2 |
| 7 | 56.5703 | 0.8 | | | | | | | |
| | | | 2.0033 | 28.27 | OHARA | SLAH79 | | | |
| 8 | 4.77167 | 1.86212 | | | | | | | |
| 9 | 31.9527 | 2.98759 | | | | | | | |
| | | | 1.84666 | 23.78 | OHARA | STIH53 | | E5 | |
| 10 | −5.1414 | 0.7 | | | | | | E6 | |
| | | | 1.883 | 40.76 | OHARA | SLAH58 | | | |
| 11 | −42.81 | 0.04 | | | | | | | |
| 12* | 286.864 | Variable DB | 1.5202 | 52.02 | | | Resin layer | | |
| 13 | ∞ | Variable DC | | | | | Aperture Stop | AD | |
| 14* | 6.24933 | 3.2304 | | | | | | | G3 |
| | | | 1.5067 | 70.5 | SUMITA | KPG325 | $θ_{gF}$=0.538 | E7 | |
| 15* | −8.4384 | 0.14996 | | | | | | | |
| 16 | 7.54621 | 2.44644 | | | | | | | |
| | | | 1.5924 | 68.3 | SUMITA | KGFK68 | $θ_{gF}$=0.546 | E8 | |
| 17 | −15.337 | 0.80163 | | | | | | | |
| | | | 1.90366 | 31.32 | HOYA | TAFD25 | | E9 | |
| 18 | 4.78897 | Variable DD | | | | | | | |
| 19* | 9.37762 | 2.24041 | | | | | | | G4 |
| | | | 1.5067 | 70.5 | SUMITA | KPG325 | | E10 | |
| 20 | 72.5489 | — | | | | | | | |
| 21 | ∞ | 0.3 | | | | | | FM | |
| | | | 1.5168 | 64.2 | | | | | |
| 22 | ∞ | 0.1 | | | | | | | |
| 23 | ∞ | 0.5 | | | | | | | |
| | | | 1.5 | 64 | | | | | |
| 24 | ∞ | — | | | | | | | |

In Table 3, each optical surface of the sixth surface, the twelfth surface, the fourteenth surface, the fifteenth surface and the nineteenth surface shown with an asterisk "*" is the aspheric surface. Parameters in the formula (A) of each aspheric surface are represented in the following table.

Aspheric Surface Parameters

Sixth Surface $K=0, A_4=1.70437 \times 10^{-4}, A_6=-8.89500 \times 10^{-6}, A_8=5.88584 \times 10^{-7}, A_{10}=-2.56139 \times 10^{-8}, A_{12}=5.44131 \times 10^{-10}, A_{14}=-4.57914 \times 10^{-12}$ Twelfth Surface $K=0, A_4=-7.78347 \times 10^{-4}, A_6=3.93144 \times 10^{-6}, A_8=-1.61339 \times 10^{-6} A_{10}=7.50104 \times 10^{-9}$ Fourteenth Surface $K=0, A_4=-8.29907 \times 10^{-4}, A_6=1.14027 \times 10^{-5}, A_8=-9.96991 \times 10^{-7} A_{10}=1.65803 \times 10^{-8}, A_{12}=1.14513 \times 10^{-11}$ Fifteenth Surface $K=0, A_4=4.54675 \times 10^{-4}, A_6=8.97554 \times 10^{-6}, A_8=-2.66344 \times 10^{-7}$ the third lens group G3 and the fourth lens group G4 are varied in accordance with zooming, as represented in the following table.

TABLE 4

| | Variable Distance | | |
|---|---|---|---|
| | Wide-angle end | Intermediate focal length | Telephoto end |
| f | 5.05 | 16.20 | 51.98 |
| D A | 0.640 | 11.382 | 18.851 |
| D B | 8.807 | 1.806 | 0.800 |
| D C | 5.892 | 4.548 | 0.950 |
| D D | 4.379 | 6.400 | 15.350 |

(1) Glass used for the positive lens of the third lens group G3 of Example 2 is included in a range defined by the "regulation line 1a" and the "regulation line 1b" which are defined by the formula (1), as illustrated in FIG. 26.

In addition, values corresponding to the formulae (2) to (6) are as follows:

$$n_{nave} - n_{pave} = 0.354 \quad (2)$$

$$Tpr = 1.217 \quad (3)$$

$$\theta_{gF} = 0.532 \quad (4)$$

$$Ft/Fw = 10.298 \quad (5)$$

$$Y'/Fw = 0.818 \quad (6)$$

Figure 6:
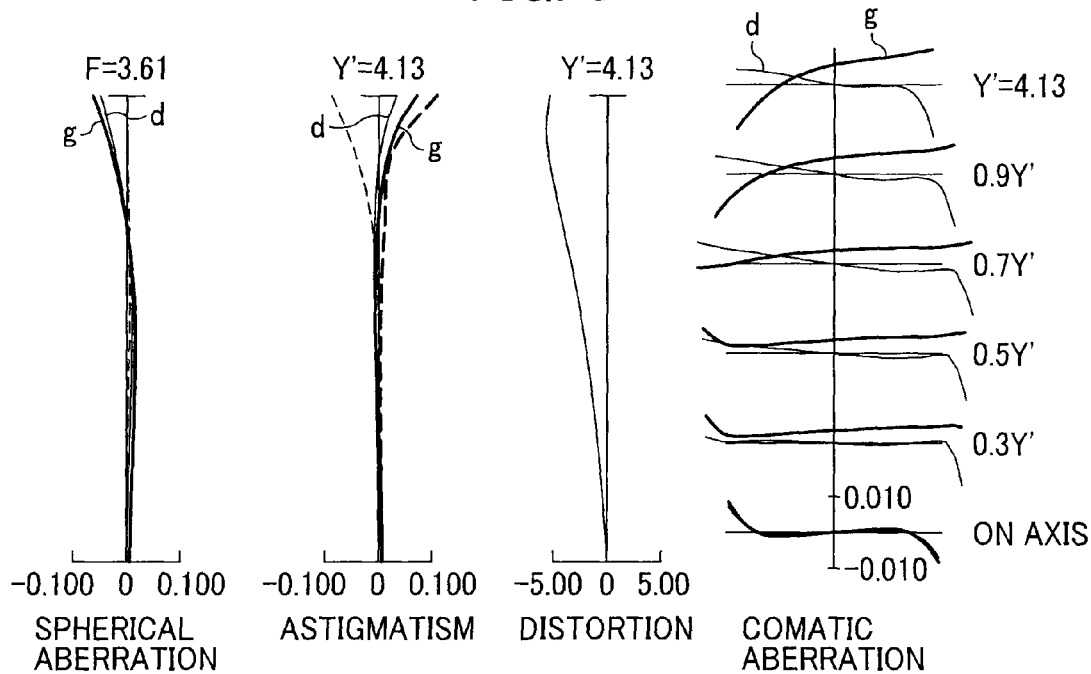
FIG. 6 is a view illustrating aberration diagrams of spherical aberration, astigmatism, distortion and comatic aberration at the wide-angle end of the zoom lens unit of Example 2 illustrated in FIGS. 5A to 5C.
Figure 7:
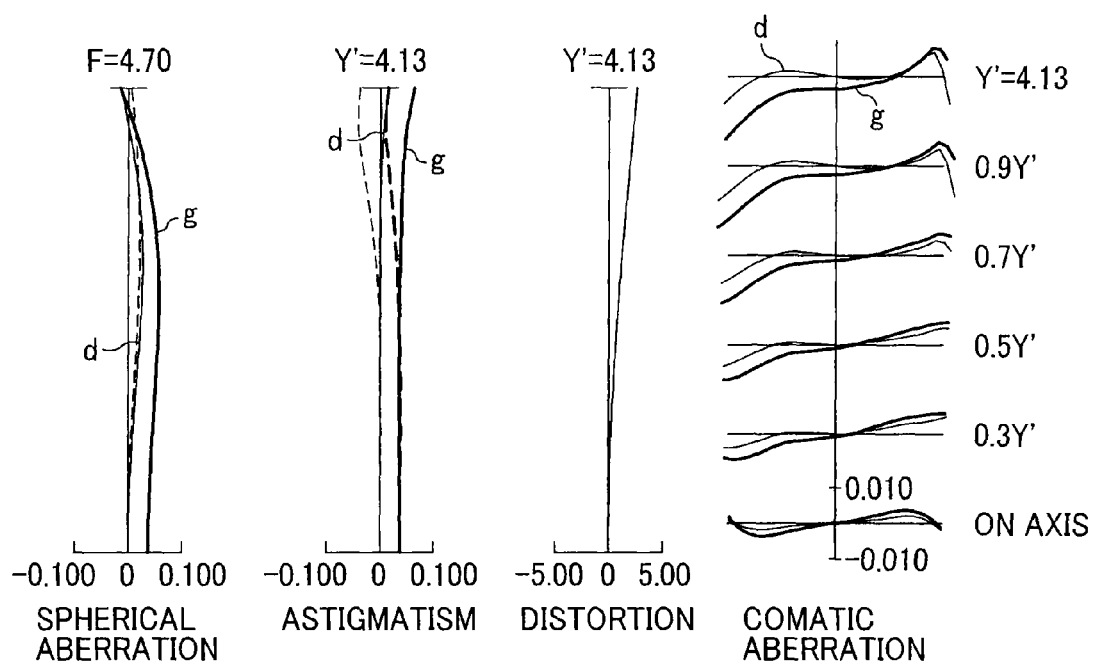
FIG. 7 is a view illustrating aberration diagrams of spherical aberration, astigmatism, distortion and comatic aberration at the position of the intermediate focal length of the zoom lens unit of Example 2 illustrated in FIGS. 5A to 5C.
Figure 8:
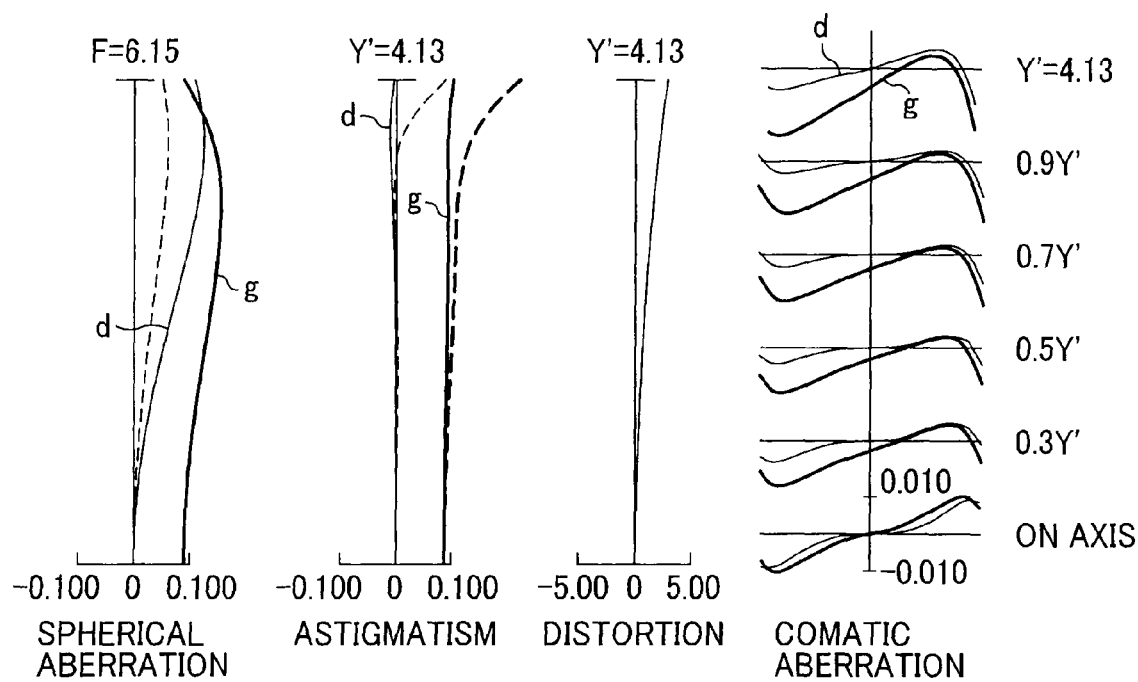
FIG. 8 is a view illustrating aberration diagrams of spherical aberration, astigmatism, distortion and comatic aberration at the telephoto end of the zoom lens unit of Example 2 illustrated in FIGS. 5A to 5C.

In addition, FIGS. 6 to 8 illustrate aberration diagrams of each aberration of spherical aberration, astigmatism, distortion and comatic aberration at the wide-angle end, at the intermediate focal length, and at the telephoto end, of Example 2, respectively.

Example 3

Figure 9A:
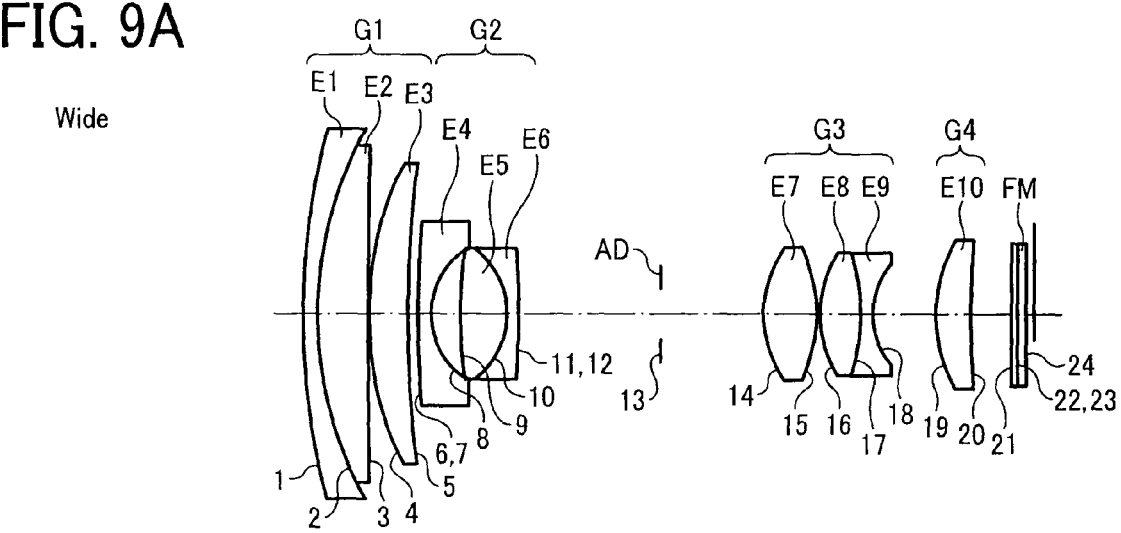
FIGS. 9A to 9C are views schematically illustrating structures of an optical system of a zoom lens unit according to Example 3 of the present invention and zoom trajectories when zooming, where.
Figure 9B:
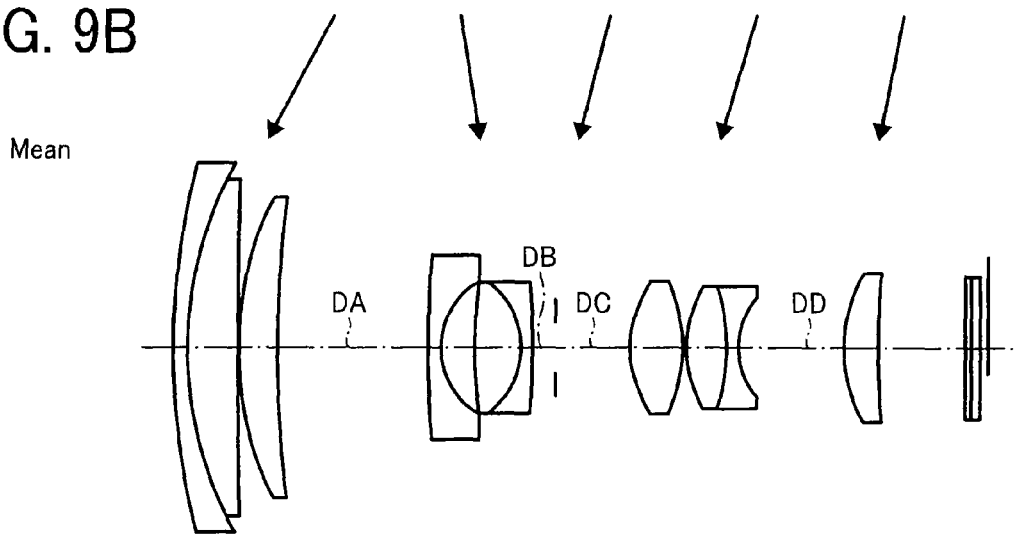
Figure 9C:
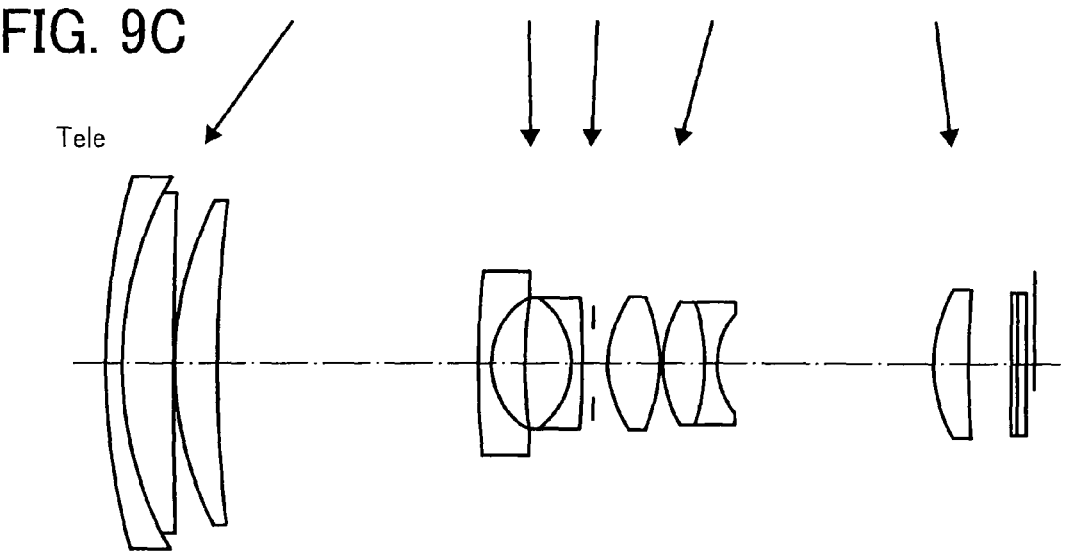

FIGS. 9A to 9C are views schematically illustrating structures of lenses, and zoom trajectories when zooming from a wide-angle end to a telephoto end, through a predetermined intermediate focal length, of a zoom lens unit according to Example 3 of the present invention, where, FIG. 9A is a sectional view at the wide-angle end, FIG. 9B is a sectional view at the predetermined intermediate focal length, and FIG. 9C is a sectional view at the telephoto end. In FIGS. 9A to 9C illustrating arrangements of the lens groups of Example 3, the left side is an object side.

A zoom lens unit illustrated in FIGS. 9A to 9C includes, along an optical axis, in order from the object side to an image side, a first lens group G1 having a positive refracting power; a second lens group G2 having a negative refracting power; a third lens group G3 having a positive refracting power; and a fourth lens group G4 having a positive refracting power, an aperture stop AD being disposed between the second lens group G2 and the third lens group G3. In this case, the first lens group G1 has a first lens E1, a second lens E2, and a third lens E3. The second lens group G2 has a fourth lens E4, a fifth lens E5, and a sixth lens E6. The third lens group G3 has a seventh lens E7, an eighth lens E8, and a ninth lens E9. The fourth lens group G4 has a tenth lens E10.

Each of the first lens group G1 to the fourth lens group G4 is supported per group by a common support frame or the like, and operates integrally per group when zooming and so on is carried out, the aperture stop AD operates independently of each lens group. In addition, surface numbers of each optical surface are also illustrated in FIGS. 9A to 9C.

Here, to avoid making the explanation complicated by increment of the digit number of reference numerals, each reference for FIGS. 9A to 9C is used independently in each of the examples; therefore, even if a common reference numeral in a figure illustrating another example is used in FIGS. 9A to 9C, it is not necessary that the corresponding structure be the same as the structure in the other example.

When changing magnification from the wide-angle end to the telephoto end, the first lens group G1 to the fourth lens group G4 are moved, and an interval between the first lens group G1 and the second lens group G2 increases, an interval between the second lens group G2 and the third lens group G3 decreases, and an interval between the third lens group G3 and the fourth lens group G4 increases.

The first lens group G1 includes, in order from the object side, the first lens E1 consisting of a negative meniscus lens having a convex surface toward the object side, the second lens E2 consisting of a positive meniscus lens having a convex surface toward the object side, and the third lens E3 consisting of a positive meniscus lens having a convex surface toward the object side. The first lens E1 and the second lens E2 are in close contact with each other and are joined together to form a cemented lens (including two lenses).

The second lens group G2 includes, in order from the object side, the fourth lens E4 which is a negative meniscus lens having a convex surface toward the object side, consisting of a hybrid aspheric lens having an aspheric surface formed by applying a resin layer to its surface on the object side, the fifth lens E5 consisting of a biconvex positive lens including a stronger convex surface toward the image side, and the sixth lens E6 which is a negative meniscus lens having a convex surface toward the image side, consisting of a hybrid aspheric lens having an aspheric surface formed by applying a resin layer to its surface on the image side. The fifth lens E5 and the sixth lens E6 are in close contact with each other and are joined together to form a cemented lens (including two lenses).

The aperture stop AD is disposed between the second lens group G2 and the third lens group G3.

The third lens group G3 includes, in order from the object side, the seventh lens E7 consisting of a positive lens having two aspheric surfaces and with a biconvex shape in which a stronger convex surface toward the object side, the eighth lens E8 consisting of a biconvex positive lens having a stronger convex surface toward the object side, and the ninth lens E9 consisting of a biconcave negative lens having a stronger concave surface toward the image side. The eighth lens E8 and the ninth lens E9 are in close contact with each other and are joined together to form a cemented lens (including two lenses).

The fourth lens group G4 has only the tenth lens E10 consisting of a positive meniscus lens having a convex surface toward the object side and forming an aspheric surface on the object side.

Namely, the zoom lens unit of Example 3 has a substantially similar structure to those of the above-mentioned Examples 1 and 2.

In this case, as illustrated in FIGS. 9A to 9C, when changing magnification from the wide-angle end to the telephoto end, the first lens group G1 and the third lens group G3 are moved from the image side to the object side monotonously, the second lens group G2 is moved from the object side to the image side almost monotonously, and the fourth lens group G4 is moved to the object side with a convex trajectory.

In Example 3, focal length of an entire zoom lens unit system, f, F-number, F, and a half-field angle, ω, change within ranges of, f=5.05-51.97, F=3.58-5.72, ω=39.3-4.54, respectively, in accordance with zooming.

Optical properties of each optical component are shown in the following table.

TABLE 5

$f = 5.05\text{-}51.97, F = 3.58\text{-}5.72, \omega = 39.3\text{-}4.54$

| Surface No. | R | D | nd | vd | Glass | | Remarks | |
|---|---|---|---|---|---|---|---|---|
| 1 | 44.9864 | 1.035 | | | | | | G1 |
| | | | 2.00069 | 25.46 | HOYA | TAFD40 | E1 | |
| 2 | 24.4589 | 3.39853 | | | | | | |
| | | | 1.603 | 65.44 | OHARA | SPHM53 | E2 | |
| 3 | 715.125 | 0.1 | | | | | | |
| 4 | 22.7794 | 2.72948 | | | | | | |
| | | | 1.7725 | 49.6 | OHARA | SLAH66 | E3 | |
| 5 | 83.5985 | Variable DA | | | | | | |
| 6* | 194.643 | 0.04 | 1.5202 | 52.02 | | | Resin layer E4 | G2 |
| 7 | 83.2685 | 0.8 | | | | | | |
| | | | 2.0033 | 28.27 | OHARA | SLAH79 | | |
| 8 | 5.13002 | 2.09294 | | | | | | |
| 9 | 42.678 | 3.16559 | | | | | | |
| | | | 1.84666 | 23.78 | OHARA | STIH53 | E5 | |
| 10 | -5.5135 | 0.7 | | | | | E6 | |
| | | | 1.883 | 40.76 | OHARA | SLAH58 | | |
| 11 | -36.246 | 0.04 | | | | | | |
| 12* | -230.03 | Variable DB | 1.5202 | 52.02 | | | Resin layer | |
| 13 | ∞ | Variable DC | | | | | Aperture Stop AD | |
| 14* | 6.56152 | 3.59273 | | | | | | G3 |
| | | | 1.48749 | 70.24 | OHARA | SFSL5 | $\theta_{gF}=$ 0.53 E7 | |
| 15* | -9.0874 | 0.28841 | | | | | | |
| 16 | 7.6035 | 2.76103 | | | | | | |
| | | | 1.5924 | 68.3 | SUMITA | KGFK68 | $\theta_{gF}=$ 0.546 E8 | |
| 17 | -13.068 | 0.8 | | | | | | |
| | | | 1.90366 | 31.32 | HOYA | TAFD25 | E9 | |
| 18 | 5.01417 | Variable DD | | | | | | |
| 19* | 8.76636 | 2.33407 | | | | | | G4 |
| | | | 1.48749 | 70.24 | OHARA | SFSL5 | E10 | |
| 20 | 60.3211 | — | | | | | | |
| 21 | ∞ | 0.3 | | | | | FM | |
| | | | 1.5168 | 64.2 | | | | |
| 22 | ∞ | 0.1 | | | | | | |
| 23 | ∞ | 0.5 | 1.5 | 64 | | | | |
| 24 | ∞ | — | | | | | | |

In Table 5, each optical surface of the sixth surface, the twelfth surface, the fourteenth surface, the fifteenth surface and the nineteenth surface shown with an asterisk "*" is the aspheric surface. Parameters in the formula (A) of each aspheric surface are represented in the following table.

Aspheric Surface Parameters

Sixth Surface
$K=0, A_4=2.25844\times10^{-4}, A_6=-1.12455\times10^{-5}, A_8=6.76369\times10^{-7}, A_{10}=-2.52638\times10^{-8}, A_{12}=4.66507\times10^{-10}, A_{14}=-3.41911\times10^{-12}$ Twelfth Surface
$K=0, A_4=-5.67227\times10^{-4}, A_6=-3.24620\times10^{-6}, A_8=-2.94393\times10^{-7} A_{10}=-1.76132\times10^{-8}$ Fourteenth Surface
$K=0, A_4=-6.53010\times10^{-4}, A_6=6.85627\times10^{-6}, A_8=-4.27084\times10^{-7}, A_{10}=2.66460\times10^{-9}, A_{12}=2.95049\times10^{-11}$ Fifteenth Surface
$K=0, A_4=3.59196\times10^{-4}, A_6=7.31481\times10^{-6}, A_8=-1.15774\times10^{-7}$ Nineteenth Surface
$K=0, A_4=-7.94840\times10^{-5}, A_6=4.43016\times10^{-6}, A_8=-1.31828\times10^{-7} A_{10}=1.68587\times10^{-9}$ The variable distance DA between the first lens group G1 and the second lens group G2, the variable distance DB between the second lens group G2 and the aperture stop AD, the variable distance DC between the aperture stop AD and the third lens group G3, and the variable distance DD between the third lens group G3 and the fourth lens group G4 are varied in accordance with zooming, as represented in the following table.

TABLE 6

| | Variable Distance | | |
|---|---|---|---|
| | Wide-angle end | Intermediate focal length | Telephoto end |
| f | 5.05 | 16.20 | 51.97 |
| D A | 0.640 | 10.248 | 18.396 |
| D B | 9.698 | 1.860 | 0.800 |
| D C | 7.052 | 5.099 | 0.950 |
| D D | 4.237 | 7.204 | 14.776 |

(1) Glass used for the positive lens of the third lens group G3 of Example 3 is included in a range defined by the "regulation line 1a" and the "regulation line 1b" which are defined by the formula (1), as illustrated in FIG. 26.

In addition, values corresponding to the formulae (2) to (6) are as follows:

$$n_{nave}-n_{pave}=0.364 \tag{2}$$

$$Tpr=1.215 \tag{3}$$

$$\theta_{gF}=0.530 \tag{4}$$

$$Ft/Fw=10.298 \tag{5}$$

$$Y'/Fw=0.818 \tag{6}$$

Figure 12:
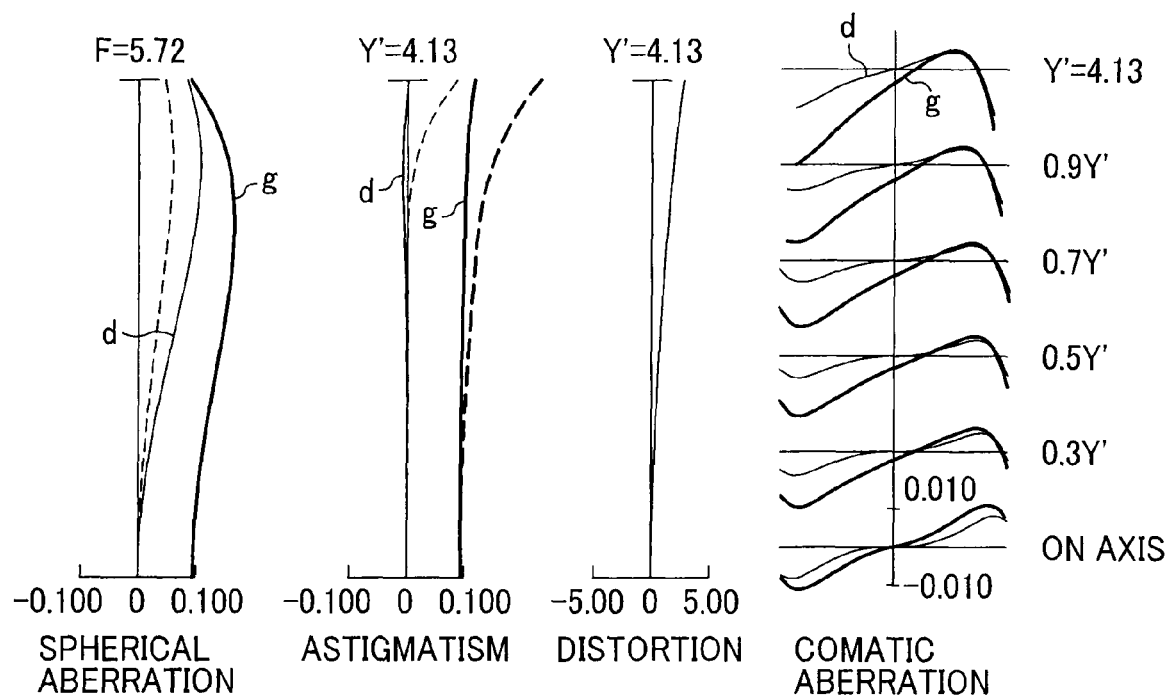
FIG. 12 is a view illustrating aberration diagrams of spherical aberration, astigmatism, distortion and comatic aberration at the telephoto end of the zoom lens unit of Example 3 illustrated in FIGS. 9A to 9C.

In addition, FIGS. 10 to 12 illustrate aberration diagrams of each aberration of spherical aberration, astigmatism, distortion and comatic aberration at the wide-angle end, at the intermediate focal length, and at the telephoto end, of Example 3, respectively.

Example 4

Figure 13A:
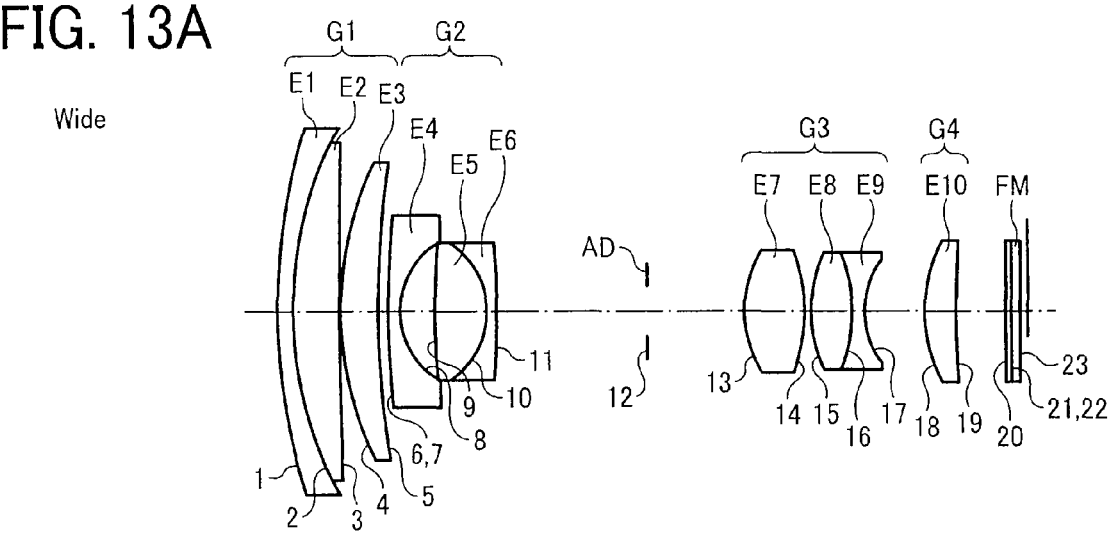
FIGS. 13A to 13C are views schematically illustrating structures of an optical system of a zoom lens unit according to Example 4 of the present invention and zoom trajectories when zooming, where.
Figure 13B:
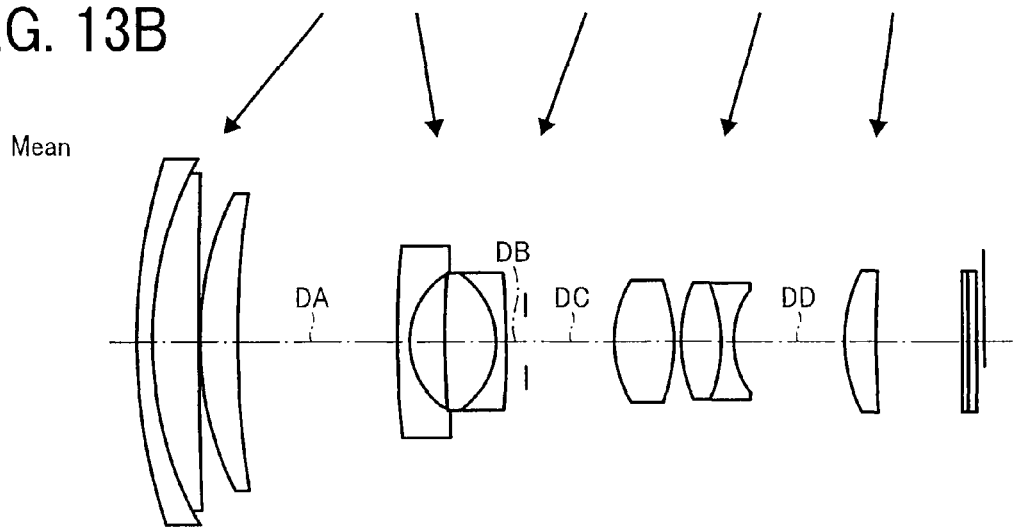
Figure 13C:
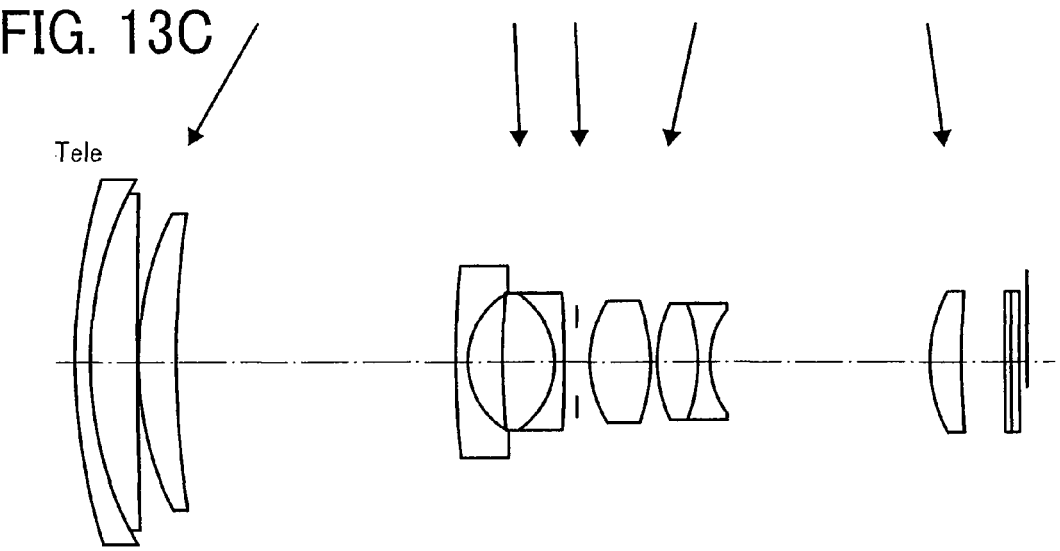

FIGS. 13A to 13C are views schematically illustrating structures of lenses, and zoom trajectories when zooming from a wide-angle end to a telephoto end, through a predetermined intermediate focal length, of a zoom lens unit according to Example 4 of the present invention, where, FIG. 13A is a sectional view at the wide-angle end, FIG. 13B is a sectional view at the predetermined intermediate focal length, and FIG. 13C is a sectional view at the telephoto end. In FIGS. 13A to 13C illustrating arrangements of the lens groups of Example 4, the left side is an object side.

A zoom lens unit illustrated in FIGS. 13A to 13C includes, along an optical axis, in order from the object side to an image side, a first lens group G1 having a positive refracting power; a second lens group G2 having a negative refracting power; a third lens group G3 having a positive refracting power; and a fourth lens group G4 having a positive refracting power, an aperture stop AD being disposed between the second lens group G2 and the third lens group G3. In this case, the first lens group G1 has a first lens E1, a second lens E2, and a third lens E3. The second lens group G2 has a fourth lens E4, a fifth lens E5, and a sixth lens E6. The third lens group G3 has a seventh lens E7, an eighth lens E8, and a ninth lens E9. The fourth lens group G4 has a tenth lens E10.

Each of the first lens group G1 to the fourth lens group G4 is supported per group by a common support frame or the like, and operates integrally per group when zooming and so on is carried out, the aperture stop AD operates independently of each lens group. In addition, surface numbers of each optical surface are also illustrated in FIGS. 13A to 13C.

Here, to avoid making the explanation complicated by increment of the digit number of reference numerals, each reference for FIGS. 13A to 13C is used independently in each of the examples; therefore, even if a common reference numeral in a figure illustrating another example is used in FIGS. 13A to 13C, it is not necessary that the corresponding structure be the same as the structure in the other example.

When changing magnification from the wide-angle end to the telephoto end, the first lens group G1 to the fourth lens group G4 are moved, and an interval between the first lens group G1 and the second lens group G2 increases, an interval between the second lens group G2 and the third lens group G3 decreases, and an interval between the third lens group G3 and the fourth lens group G4 increases.

The first lens group G1 includes, in order from the object side, the first lens E1 consisting of a negative meniscus lens having a convex surface toward the object side, the second lens E2 consisting of a positive meniscus lens having a convex surface toward the object side, and the third lens E3 consisting of a positive meniscus lens having a convex surface toward the object side. The first lens E1 and the second lens E2 are in close contact with each other and are joined together to form a cemented lens (including two lenses).

The second lens group G2 includes, in order from the object side, the fourth lens E4 which is a negative meniscus lens having a convex surface toward the object side, consisting of a hybrid aspheric lens having an aspheric surface formed by applying a resin layer to its surface on the object side, the fifth lens E5 consisting of a biconvex positive lens including a stronger convex surface toward the image side, and the sixth lens E6 which is a negative meniscus lens having a convex surface toward the image side, consisting of a lens having an aspheric surface on its image side. The fifth lens E5 and the sixth lens E6 are in close contact with each other and are joined together to form a cemented lens (including two lenses).

The aperture stop AD is disposed between the second lens group G2 and the third lens group G3.

The third lens group G3 includes, in order from the object side, the seventh lens E7 consisting of a positive lens having two aspheric surfaces and with a biconvex shape in which a stronger convex surface toward the object side, the eighth lens E8 consisting of a biconvex positive lens having a stronger convex surface toward the object side, and the ninth lens E9 consisting of a biconcave negative lens having a stronger concave surface toward the image side. The eighth lens E8 and the ninth lens E9 are in close contact with each other and are joined together to form a cemented lens (including two lenses).

The fourth lens group G4 has only the tenth lens E10 consisting of a positive meniscus lens having a convex surface toward the object side and forming an aspheric surface on the object side.

Namely, the zoom lens unit of Example 4 has a substantially similar structure to that of the above-mentioned Example 1, except that a resin layer is not applied to the surface nearest to the image side, of the second lens group G2, i.e., the surface of the sixth lens E6 on the image side (surface number 11).

In this case, as illustrated in FIGS. 13A to 13C, when changing magnification from the wide-angle end to the telephoto end, the first lens group G1 and the third lens group G3 are moved from the image side to the object side monotonously, the second lens group G2 is moved from the object side to the image side almost monotonously, and the fourth lens group G4 is moved to the object side with a convex trajectory.

In Example 4, focal length of an entire zoom lens unit system, f, F-number, F, and a half-field angle, $\omega$, change within ranges of, f=5.06-52.00, F=3.67-5.88, $\omega$=39.3-4.54, respectively, in accordance with zooming.

Optical properties of each optical component are shown in the following table.

TABLE 7 f = 5.06-52.00, F = 3.67-5.88, $\omega$ = 39.3-4.54

| Surface No. | R | D | nd | vd | Glass | | Remarks |
|---|---|---|---|---|---|---|---|
| 1 | 39.3312 | 1.03 | | | | | G1 |
| | | | 2.00069 | 25.46 | HOYA | TAFD40 | E1 |
| 2 | 24.3582 | 3.14622 | | | | | |
| | | | 1.603 | 65.44 | OHARA | SPHM53 | E2 |

TABLE 7-continued

| | f = 5.06-52.00, F = 3.67-5.88, ω = 39.3-4.54 | | | | | | | |
|---|---|---|---|---|---|---|---|---|
| Surface No. | R | D | nd | vd | | Glass | Remarks | |
| 3 | 358.516 | 0.1 | | | | | | |
| 4 | 22.1181 | 2.47274 | | | | | | |
| | | | 1.72916 | 54.68 | OHARA | SLAL18 | E3 | |
| 5 | 66.837 | Variable DA | | | | | | |
| 6* | 181.937 | 0.04 | 1.5202 | 52.02 | | | Resin layer E4 | G2 |
| 7 | 58.5901 | 0.8 | | | | | | |
| | | | 2.00069 | 25.46 | HOYA | TAFD40 | | |
| 8 | 5.04203 | 2.35583 | | | | | | |
| 9 | 73.4068 | 3.4852 | | | | | | |
| | | | 1.84666 | 23.78 | HOYA | FDS90 | E5 | |
| 10 | −5.1686 | 0.6 | | | | | | |
| | | | 1.8208 | 42.71 | HOYA | MTAFD51 | E6 | |
| 11* | −117.69 | Variable DB | | | | | | |
| 12 | ∞ | Variable DC | | | | | Aperture Stop | AD |
| 13* | 6.60113 | 4.01405 | | | | | | G3 |
| | | | 1.48749 | 70.44 | HOYA | FC5 | θ$_{gF}$ = 0.5305 | E7 |
| 14* | −9.2793 | 0.435 | | | | | | |
| 15 | 8.35798 | 2.765 | | | | | | |
| | | | 1.59319 | 67.9 | HIKARI | EPSKH1 | θ$_{gF}$ = 0.544 | E8 |
| 16 | −8.9653 | 0.80102 | | | | | | |
| | | | 1.90366 | 31.32 | HOYA | TAFD25 | E9 | |
| 17 | 5.88563 | Variable DD | | | | | | |
| 18* | 9.70656 | 2.07 | | | | | | G4 |
| | | | 1.52528 | 56.2 | | Plastic | E10 | |
| 19 | 56.3632 | — | | | | | | |
| 20 | ∞ | 0.3 | | | | | FM | |
| | | | 1.5168 | 64.2 | | | | |
| 21 | ∞ | 0.1 | | | | | | |
| 22 | ∞ | 0.5 | | | | | | |
| | | | 1.5 | 64 | | | | |
| 23 | ∞ | — | | | | | | |

In Table 7, each optical surface of the sixth surface, the eleventh surface, the thirteenth surface, the fourteenth surface and the eighteenth surface shown with an asterisk "*" is the aspheric surface. Parameters in the formula (A) of each aspheric surface are represented in the following table.

Aspheric Surface Parameters

Sixth Surface

K=0, $A_4$=1.87731×10$^{-4}$, $A_6$=−8.48011×10$^{-6}$, $A_8$=5.31966× 10$^{-7}$, $A_{10}$=−1.96752×10$^{-8}$, $A_{12}$=3.60944×10$^{-10}$, $A_{14}$=−2.61168×10$^{-12}$

Eleventh Surface

K=0, $A_4$=−3.09393×10$^{-4}$, $A_6$=−2.60609×10$^{-6}$, $A_8$=9.00781× 10$^{-8}$, $A_{10}$=−2.11546×10$^{-8}$, $A_{12}$=5.00134×10$^{-12}$

Thirteenth Surface

K=0, $A_4$=−5.34737×10$^{-4}$, $A_6$=1.25801×10$^{-5}$, $A_8$=−6.90959× 10$^{-7}$, $A_{10}$=3.54100×10$^{-8}$, $A_{12}$=−3.42791×10$^{-10}$

Fourteenth Surface

K=0, $A_4$=4.15136×10$^{-4}$, $A_6$=1.12480×10$^{-5}$, $A_8$=−1.24918× 10$^{-7}$, $A_{10}$=2.42397×10$^{-8}$

Eighteenth Surface

K=0, $A_4$=−5.80774×10$^{-5}$, $A_6$=4.48970×10$^{-6}$, $A_8$=−1.43440× 10$^{-7}$, $A_{10}$=1.99458×10$^{-9}$

The variable distance DA between the first lens group G1 and the second lens group G2, the variable distance DB between the second lens group G2 and the aperture stop AD, the variable distance DC between the aperture stop AD and the third lens group G3, and the variable distance DD between the third lens group G3 and the fourth lens group G4 are varied in accordance with zooming, as represented in the following table.

TABLE 8

| | Variable Distance | | |
|---|---|---|---|
| | Wide-angle end | Intermediate focal length | Telephoto end |
| f | 5.06 | 16.22 | 52.00 |
| D A | 0.640 | 10.755 | 18.680 |
| D B | 10.098 | 1.224 | 0.800 |
| D C | 6.605 | 6.012 | 0.950 |
| D D | 3.924 | 7.359 | 14.724 |

(1) Glass used for the positive lens of the third lens group G3 of Example 4 is included in a range defined by the "regulation line 1a" and the "regulation line 1b" which are defined by the formula (1), as illustrated in FIG. 26.

In addition, values corresponding to the formulae (2) to (6) are as follows:

$$n_{nave}-n_{pave}=0.363 \qquad (2)$$

$$Tpr=1.197 \qquad (3)$$

$$θ_{gF}=0.550 \qquad (4)$$

$$Ft/Fw=10.285 \qquad (5)$$

$$Y'/Fw=0.817 \qquad (6)$$

Figure 14:
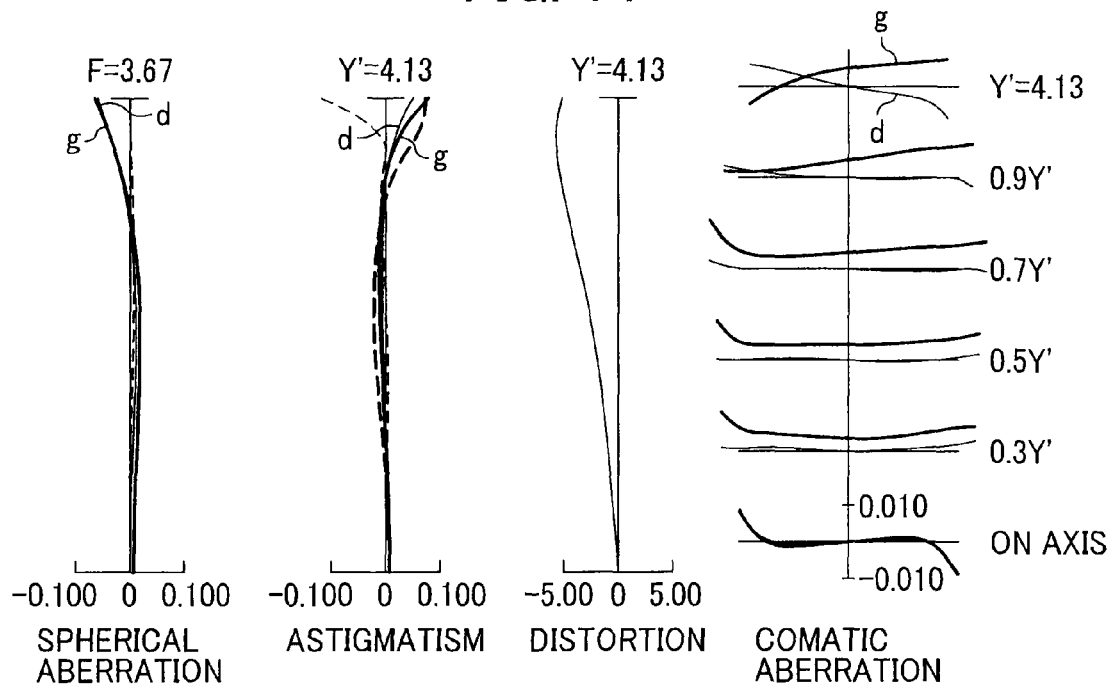
FIG. 14 is a view illustrating aberration diagrams of spherical aberration, astigmatism, distortion and comatic aberration at the wide-angle end of the zoom lens unit of Example 4 illustrated in FIGS. 13A to 13C.
Figure 15:
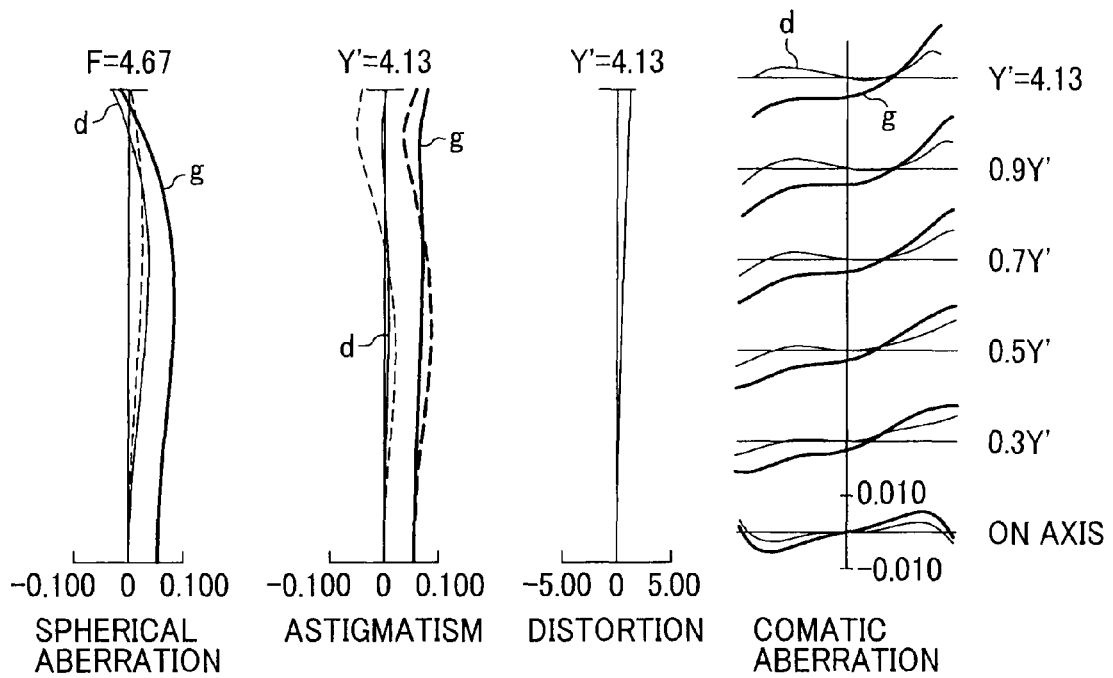
FIG. 15 is a view illustrating aberration diagrams of spherical aberration, astigmatism, distortion and comatic aberration at the position of the intermediate focal length of the zoom lens unit of Example 4 illustrated in FIGS. 13A to 13C.
Figure 16:
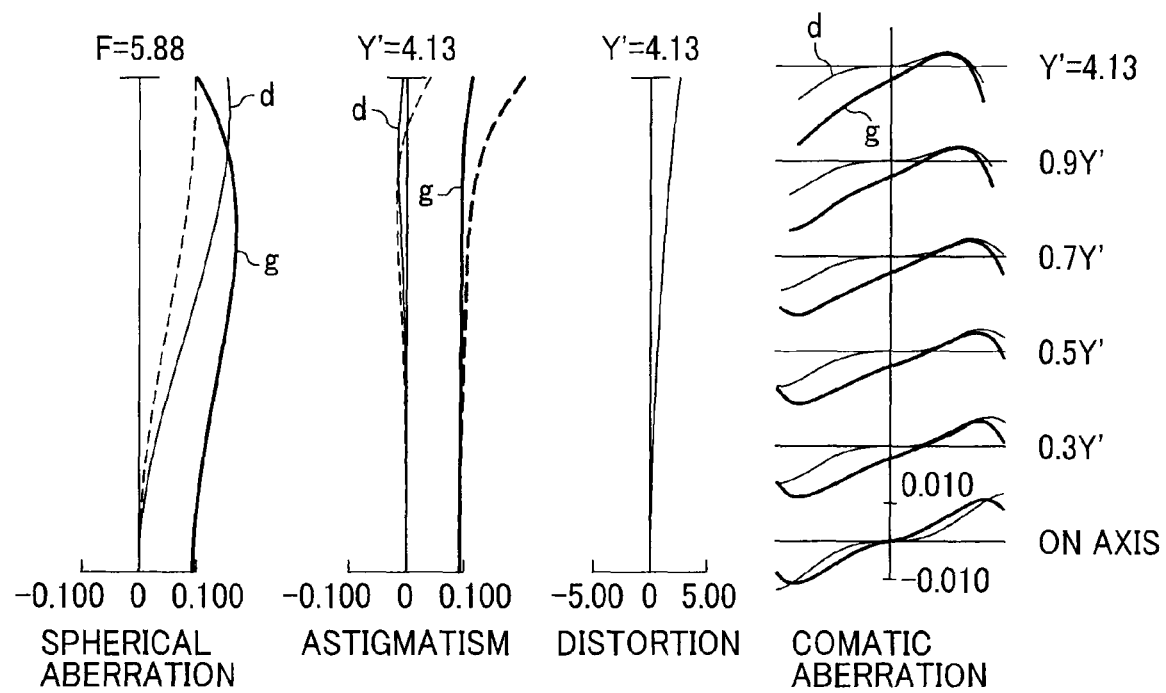
FIG. 16 is a view illustrating aberration diagrams of spherical aberration, astigmatism, distortion and comatic aberration at the telephoto end of the zoom lens unit of Example 4 illustrated in FIGS. 13A to 13C.

In addition, FIGS. 14 to 16 illustrate aberration diagrams of each aberration of spherical aberration, astigmatism, distortion and comatic aberration at the wide-angle end, at the intermediate focal length, and at the telephoto end, of Example 4, respectively.

Example 5

Figure 17A:
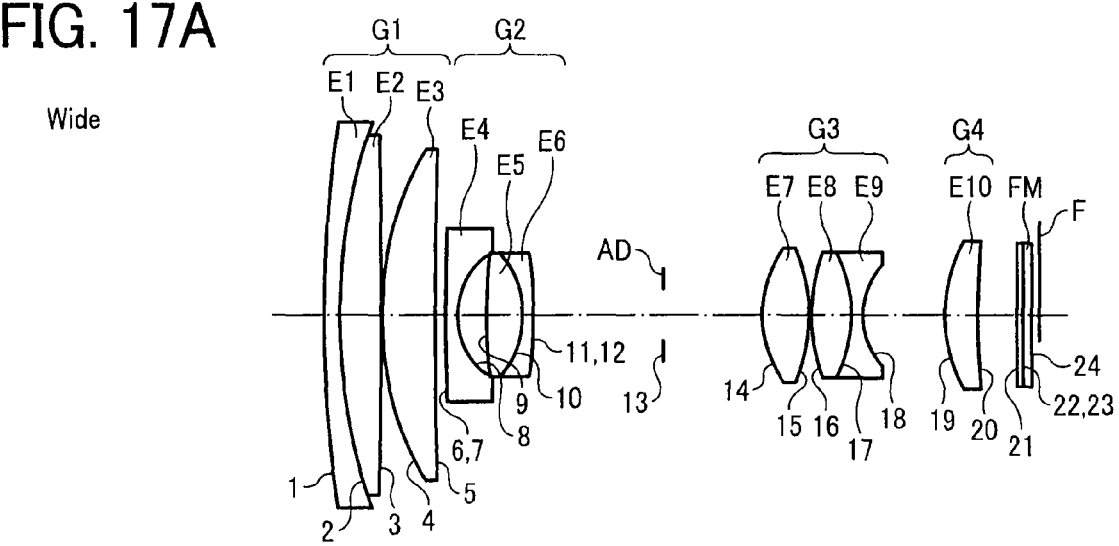
FIGS. 17A to 17C are views schematically illustrating structures of an optical system of a zoom lens unit according to Example 5 of the present invention and zoom trajectories when zooming, where.
Figure 17B:
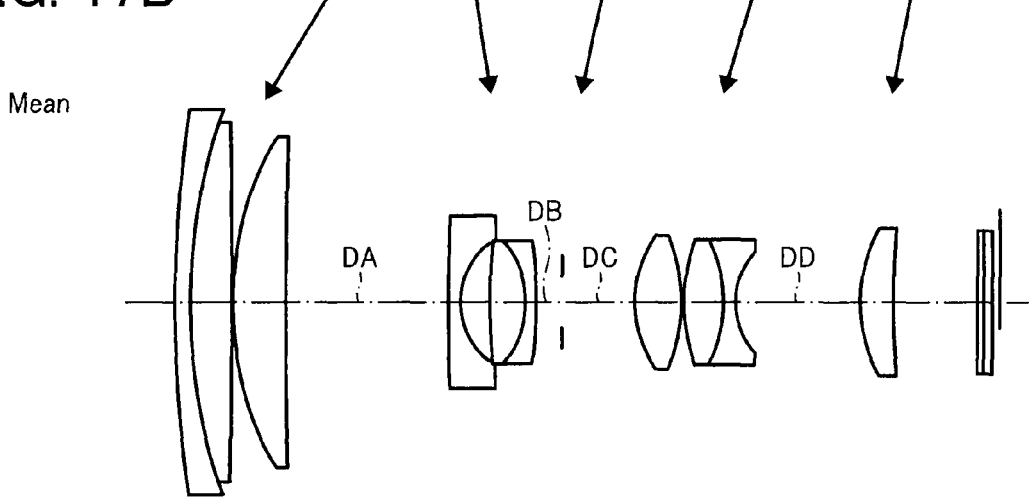
Figure 17C:
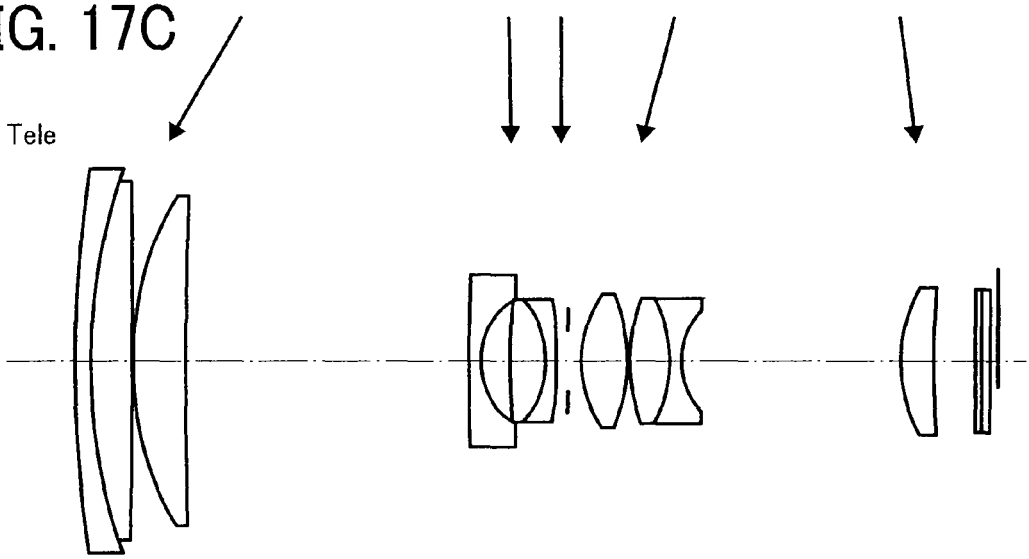

FIGS. 17A to 17C are views schematically illustrating structures of lenses, and zoom trajectories when zooming from a wide-angle end to a telephoto end, through a predetermined intermediate focal length, of a zoom lens unit according to Example 5 of the present invention, where, FIG. 17A is a sectional view at the wide-angle end, FIG. 17B is a sectional view at the predetermined intermediate focal length, and FIG. 17C is a sectional view at the telephoto end. In FIGS. 17A to 17C illustrating arrangements of the lens groups of Example 5, the left side is an object side.

A zoom lens unit illustrated in FIGS. 17A to 17C includes, along an optical axis, in order from the object side to an image side, a first lens group G1 having a positive refracting power; a second lens group G2 having a negative refracting power; a third lens group G3 having a positive refracting power; and a fourth lens group G4 having a positive refracting power, an aperture stop AD being disposed between the second lens group G2 and the third lens group G3. In this case, the first lens group G1 has a first lens E1, a second lens E2, and a third lens E3. The second lens group G2 has a fourth lens E4, a fifth lens E5, and a sixth lens E6. The third lens group G3 has a seventh lens E7, an eighth lens E8, and a ninth lens E9. The fourth lens group G4 has a tenth lens E10.

Each of the first lens group G1 to the fourth lens group G4 is supported per group by a common support frame or the like, and operates integrally per group when zooming and so on is carried out, the aperture stop AD operates independently of each lens group. In addition, surface numbers of each optical surface are also illustrated in FIGS. 17A to 17C.

Here, to avoid making the explanation complicated by increment of the digit number of reference numerals, each reference for FIGS. 17A to 17C is used independently in each of the examples; therefore, even if a common reference numeral in a figure illustrating another example is used in FIGS. 17A to 17C, it is not necessary that the corresponding structure be the same as the structure in the other example.

When changing magnification from the wide-angle end to the telephoto end, all the first lens group G1 to the fourth lens group G4 are moved, and an interval between the first lens group G1 and the second lens group G2 increases, an interval between the second lens group G2 and the third lens group G3 decreases, and an interval between the third lens group G3 and the fourth lens group G4 increases.

The first lens group G1 includes, in order from the object side, the first lens E1 consisting of a negative meniscus lens having a convex surface toward the object side, the second lens E2 consisting of a biconvex positive lens having a stronger convex surface toward the object side, and the third lens E3 consisting of a positive meniscus lens having a convex surface toward the object side and having an aspheric surface on its image side. The first lens E1 and the second lens E2 are in close contact with each other and are joined together to form a cemented lens (including two lenses).

The second lens group G2 includes, in order from the object side, the fourth lens E4 which is a negative meniscus lens having a convex surface toward the object side, consisting of a hybrid aspheric lens having an aspheric surface formed by applying a resin layer to its surface on the object side, the fifth lens E5 consisting of a biconvex positive lens including a stronger convex surface toward the image side, and the sixth lens E6 which is a negative meniscus lens having a convex surface toward the image side, consisting of a hybrid aspheric lens having an aspheric surface formed by applying a resin layer to its surface on the image side. The fifth lens E5 and the sixth lens E6 are in close contact with each other and are joined together to form a cemented lens (including two lenses).

The aperture stop AD is disposed between the second lens group G2 and the third lens group G3.

The third lens group G3 includes, in order from the object side, the seventh lens E7 consisting of a positive lens having two aspheric surfaces and with a biconvex shape in which a stronger convex surface toward the object side, the eighth lens E8 consisting of a biconvex positive lens having a stronger convex surface toward the image side, and the ninth lens E9 consisting of a biconcave negative lens having a stronger concave surface toward the image side. The eighth lens E8 and the ninth lens E9 are in close contact with each other and are joined together to form a cemented lens (including two lenses).

The fourth lens group G4 has only the tenth lens E10 consisting of a positive meniscus lens having a convex surface toward the object side and forming an aspheric surface on the object side.

Namely, the zoom lens unit of Example 5 has a substantially similar structure to that of the above-mentioned Example 1, except that the second lens of the first lens group G1, i.e., the second lens E2 is a biconvex lens having a stronger convex surface toward the object side, and the surface nearest to the image side, of the first lens group G1, i.e., the surface of the third lens E3 on the image side (surface number 5) has an aspheric surface, and the second positive lens of the third lens group G3, i.e., the eighth lens E8 is a biconvex lens having a stronger convex surface toward the image side.

In this case, as illustrated in FIGS. 17A to 17C, when changing magnification from the wide-angle end to the telephoto end, the first lens group G1 and the third lens group G3 are moved from the image side to the object side monotonously, the second lens group G2 is moved from the object side to the image side almost monotonously, and the fourth lens group G4 is moved to the object side with a convex trajectory.

In Example 5, focal length of an entire zoom lens unit system, f, F-number, F, and a half-field angle, ω, change within ranges of, f=5.10-52.51, F=3.66-6.08, ω=39.0-4.50, respectively, in accordance with zooming.

Optical properties of each optical component are shown in the following table.

TABLE 9

| | f = 5.10-52.51, F = 3.66-6.08, ω = 39.0-4.50 | | | | | |
|---|---|---|---|---|---|---|
| Surface No. | R | D | nd | vd | Glass | Remarks |
| 1 | 84.2678 | 1.02 | | | | G1 |
| | | | 2.00069 | 25.46 HOYA | TAFD40 | E1 |
| 2 | 37.1485 | 2.73849 | | | | |
| | | | 1.603 | 65.44 OHARA | SPHM53 | E2 |

TABLE 9-continued f = 5.10-52.51, F = 3.66-6.08, ω = 39.0-4.50

| Surface No. | R | D | nd | vd | Glass | | Remarks | |
|---|---|---|---|---|---|---|---|---|
| 3 | −382.3 | 0.1 | | | | | | |
| 4 | 21.2932 | 3.55069 | | | | | E3 | |
| | | | 1.5924 | 68.3 | SUMITA | KGFK68 | | |
| 5* | 10944.4 | Variable DA | | | | | | |
| 6* | 231.738 | 0.04 | 1.5202 | 52.02 | | | Resin layer E4 | G2 |
| 7 | 122.537 | 0.8 | | | | | | |
| | | | 1.883 | 40.76 | OHARA | SLAH58 | | |
| 8 | 4.65642 | 1.89752 | | | | | | |
| 9 | 41.7643 | 2.52947 | | | | | E5 | |
| | | | 1.75211 | 25.05 | HOYA | FF8 | | |
| 10 | −5.9515 | 0.7 | | | | | E6 | |
| | | | 1.883 | 40.76 | OHARA | SLAH58 | | |
| 11 | −24.167 | 0.04 | | | | | | |
| 12* | −70.781 | Variable DB | 1.5202 | 52.02 | | | Resin layer | |
| 13 | ∞ | Variable DC | | | | | Aperture Stop | AD |
| 14* | 6.4109 | 3.09995 | | | | | E7 | G3 |
| | | | 1.5067 | 70.5 | SUMITA | KPG325 | $\theta_{gF}=$ 0.538 | |
| 15* | −9.311 | 0.1 | | | | | | |
| 16 | 10.4979 | 2.6769 | | | | | E8 | |
| | | | 1.5924 | 68.3 | SUMITA | KGFK68 | $\theta_{gF}=$ 0.546 | |
| 17 | −8.3536 | 0.8 | | | | | E9 | |
| | | | 1.72047 | 34.71 | OHARA | SNBH8 | | |
| 18 | 4.97379 | Variable DD | | | | | | |
| 19* | 8.92833 | 2.20315 | | | | | E10 | G4 |
| | | | 1.5067 | 70.5 | SUMITA | KPG325 | | |
| 20 | 40.9714 | — | | | | | | |
| 21 | ∞ | 0.3 | | | | | FM | |
| | | | 1.5168 | 64.2 | | | | |
| 22 | ∞ | 0.1 | | | | | | |
| 23 | ∞ | 0.5 | | | | | | |
| | | | 1.5 | 64 | | | | |
| 24 | ∞ | | | | | | | |

In Table 9, each optical surface of the fifth surface, the sixth surface, the twelfth surface, the fourteenth surface, the fifteenth surface, and the nineteenth surface shown with an asterisk "*" is the aspheric surface. Parameters in the formula (A) of each aspheric surface are represented in the following table.

Aspheric Surface Parameters
Fifth Surface
$K=0$, $A_4=6.74244\times10^{-6}$, $A_6=1.71567\times10^{-8}$, $A_8=-5.77985\times10^{-10}$, $A_{10}=6.82490\times10^{-12}$, $A_{12}=-3.92899\times10^{-14}$, $A_{14}=8.90124\times10^{-17}$
Sixth Surface
$K=0$, $A_4=2.82064\times10^{-4}$, $A_6=-1.64412\times10^{-5}$, $A_8=7.67008\times10^{-7}$, $A_{10}=-2.50553\times10^{-8}$, $A_{12}=4.03304\times10^{-10}$, $A_{14}=-2.59031\times10^{-12}$
Twelfth Surface
$K=0$, $A_4=-7.30452\times10^{-4}$, $A_6=-1.28510\times10^{-5}$, $A_8=-1.51108\times10^{-8}$, $A_{10}=-4.94285\times10^{-8}$
Fourteenth Surface
$K=0$, $A_4=-7.37337\times10^{-4}$, $A_6=6.09853\times10^{-6}$, $A_8=-3.31772\times10^{-7}$, $A_{10}=1.12573\times10^{-9}$
Fifteenth Surface
$K=0$, $A_4=3.65974\times10^{-4}$, $A_6=7.04803\times10^{-6}$, $A_8=-8.52137\times10^{-8}$
Nineteenth Surface
$K=0$, $A_4=-7.06590\times10^{-5}$, $A_6=2.65324\times10^{-6}$, $A_8=-3.92249\times10^{-8}$ The variable distance DA between the first lens group G1 and the second lens group G2, the variable distance DB between the second lens group G2 and the aperture stop AD, the variable distance DC between the aperture stop AD and the third lens group G3, and the variable distance DD between the third lens group G3 and the fourth lens group G4 are varied in accordance with zooming, as represented in the following table.

TABLE 10

| | Variable Distance | | |
|---|---|---|---|
| | Wide-angle end | Intermediate focal length | Telephoto end |
| f | 5.10 | 16.36 | 52.51 |
| D A | 0.64 | 10.89252 | 18.94725 |
| D B | 9 | 1.69361 | 0.8 |
| D C | 6.65969 | 5.15765 | 0.95 |
| D D | 5.48522 | 8.28286 | 14.80659 |

(1) Glass used for the positive lens of the third lens group G3 of Example 5 is included in a range defined by the "regulation line 1a" and the "regulation line 1b" which are defined by the formula (1), as illustrated in FIG. 26.

In addition, values corresponding to the formulae (2) to (6) are as follows:

$$n_{nave}-n_{pave}=0.171 \quad (2)$$

$$Tpr=1.205 \quad (3)$$

$$\theta_{gF}=0.538 \quad (4)$$

$$Ft/Fw=10.298 \quad (5)$$

$$Y'/Fw=0.810 \quad (6)$$

Figure 18:
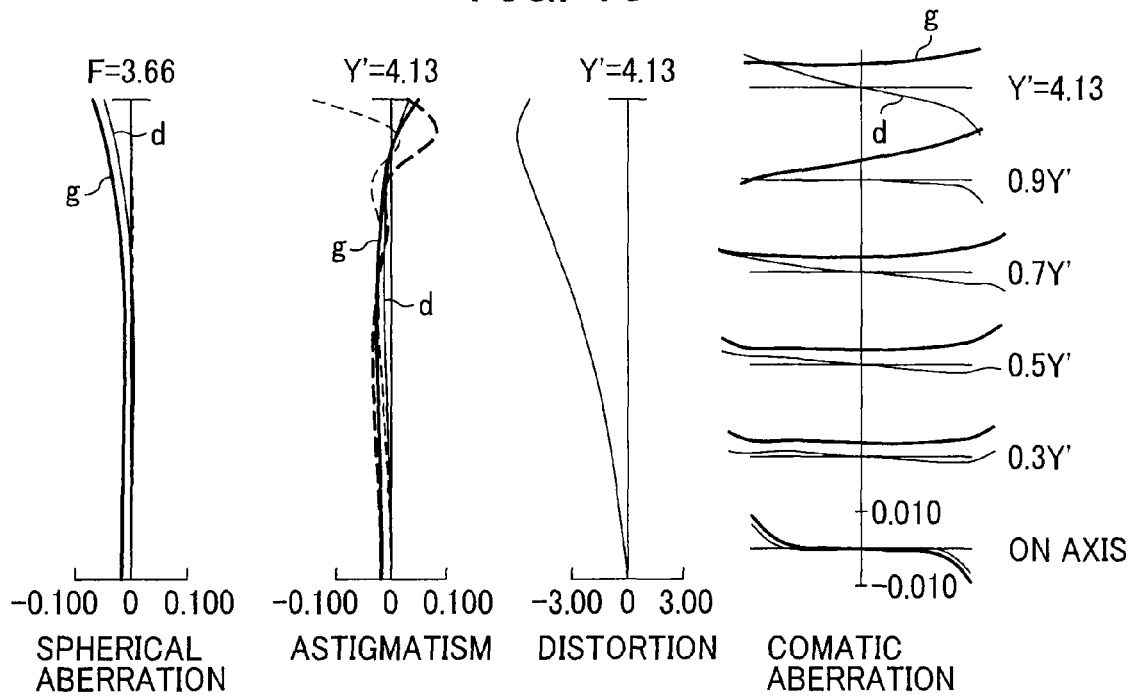
FIG. 18 is a view illustrating aberration diagrams of spherical aberration, astigmatism, distortion and comatic aberration at the wide-angle end of the zoom lens unit of Example 5 illustrated in FIGS. 17A to 17C.
Figure 19:
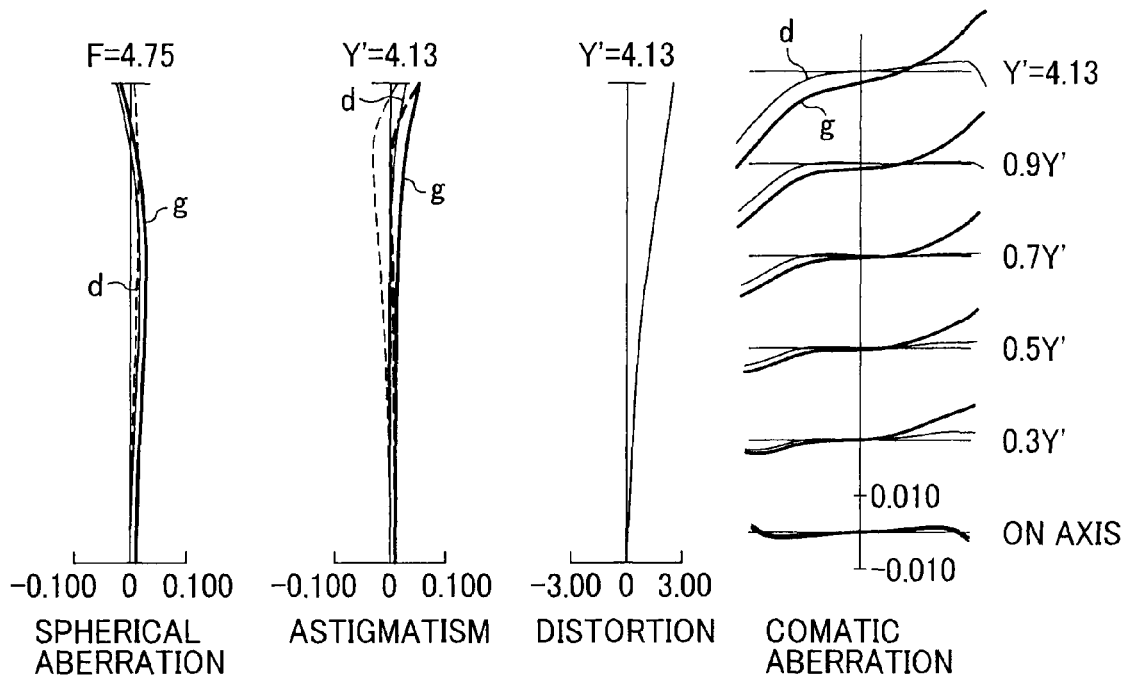
FIG. 19 is a view illustrating aberration diagrams of spherical aberration, astigmatism, distortion and comatic aberration at the position of the intermediate focal length of the zoom lens unit of Example 5 illustrated in FIGS. 17A to 17C.
Figure 20:
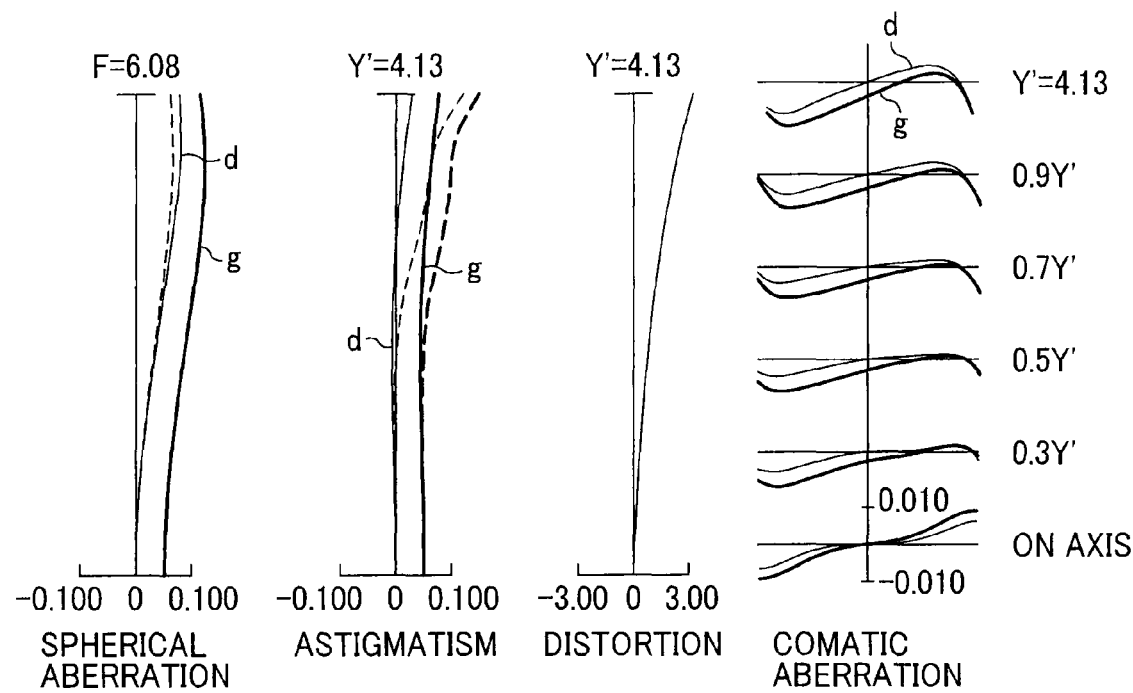
FIG. 20 is a view illustrating aberration diagrams of spherical aberration, astigmatism, distortion and comatic aberration at the telephoto end of the zoom lens unit of Example 5 illustrated in FIGS. 17A to 17C.

In addition, FIGS. 18 to 20 illustrate aberration diagrams of each aberration of spherical aberration, astigmatism, distortion and comatic aberration at the wide-angle end, at the intermediate focal length, and at the telephoto end, of Example 5, respectively.

Example 6

Figure 21A:
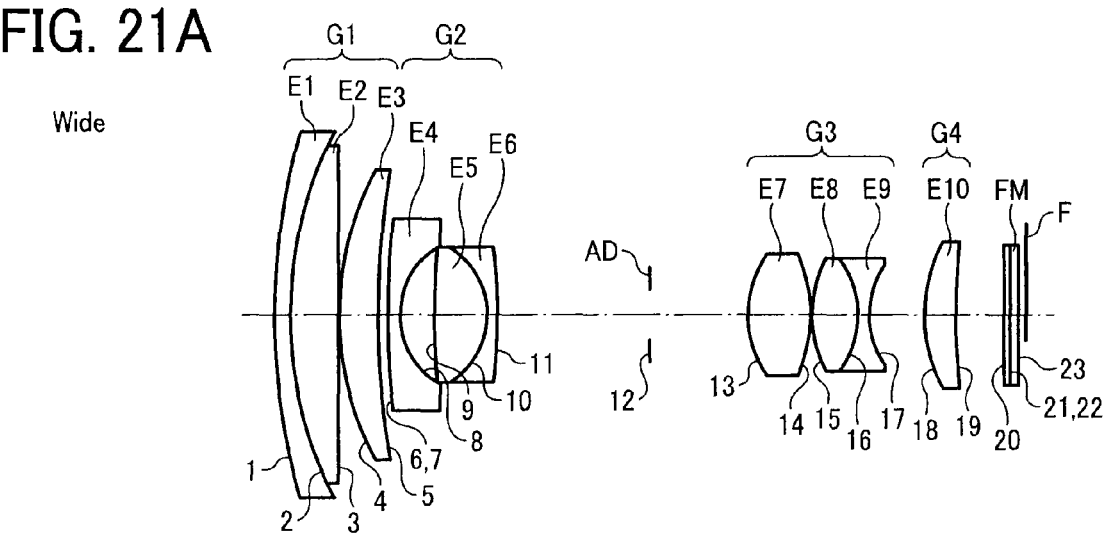
FIGS. 21A to 21C are views schematically illustrating structures of an optical system of a zoom lens unit according to Example 6 of the present invention and zoom trajectories when zooming, where.
Figure 21B:
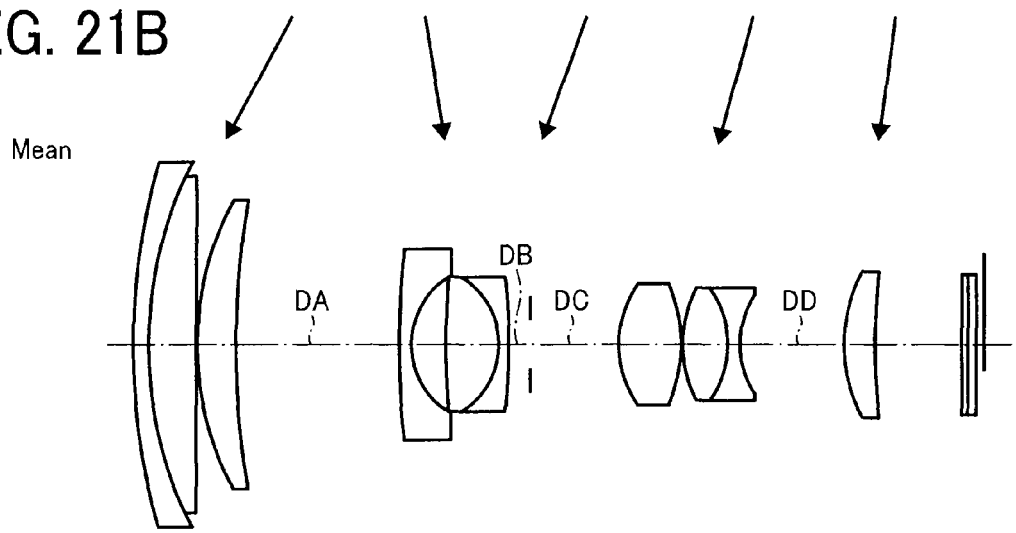
Figure 21C:
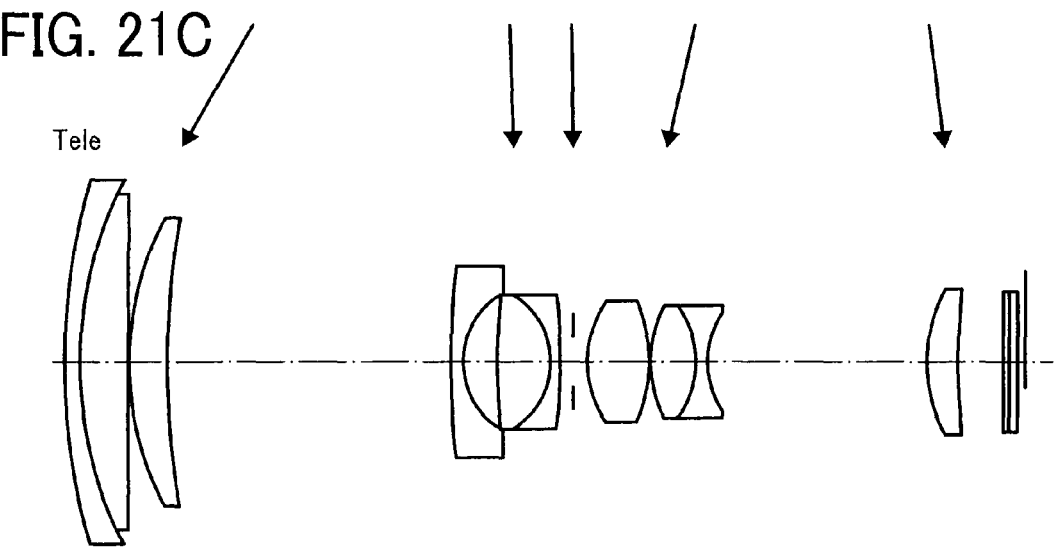

FIGS. 21A to 21C are views schematically illustrating structures of lenses, and zoom trajectories when zooming from a wide-angle end to a telephoto end, through a predetermined intermediate focal length, of a zoom lens unit according to Example 6 of the present invention, where, FIG. 21A is a sectional view at the wide-angle end, FIG. 21B is a sectional view at the predetermined intermediate focal length, and FIG. 21C is a sectional view at the telephoto end. In FIGS. 21A to 21C illustrating arrangements of the lens groups of Example 6, the left side is an object side.

A zoom lens unit illustrated in FIGS. 21A to 21C includes, along an optical axis, in order from the object side to an image side, a first lens group G1 having a positive refracting power; a second lens group G2 having a negative refracting power; a third lens group G3 having a positive refracting power; and a fourth lens group G4 having a positive refracting power, an aperture stop AD being disposed between the second lens group G2 and the third lens group G3. In this case, the first lens group G1 has a first lens E1, a second lens E2, and a third lens E3. The second lens group G2 has a fourth lens E4, a fifth lens E5, and a sixth lens E6. The third lens group G3 has a seventh lens E7, an eighth lens E8, and a ninth lens E9. The fourth lens group G4 has a tenth lens E10.

Each of the first lens group G1 to the fourth lens group G4 is supported per group by a common support frame or the like, and operates integrally per group when zooming and so on is carried out, the aperture stop AD operates independently of each lens group. In addition, surface numbers of each optical surface are also illustrated in FIGS. 21A to 21C.

Here, to avoid making the explanation complicated by increment of the digit number of reference numerals, each reference for FIGS. 21A to 21C is used independently in each of the examples; therefore, even if a common reference numeral in a figure illustrating another example is used in FIGS. 21A to 21C, it is not necessary that the corresponding structure be the same as the structure in the other example.

When changing magnification from the wide-angle end to the telephoto end, the first lens group G1 to the fourth lens group G4 are moved, and an interval between the first lens group G1 and the second lens group G2 increases, an interval between the second lens group G2 and the third lens group G3 decreases, and an interval between the third lens group G3 and the fourth lens group G4 increases.

The first lens group G1 includes, in order from the object side, the first lens E1 consisting of a negative meniscus lens having a convex surface toward the object side, the second lens E2 consisting of a plane-convex positive lens having a convex surface toward the object side, and the third lens E3 consisting of a positive meniscus lens having a convex surface toward the object side. The first lens E1 and the second lens E2 are in close contact with each other and are joined together to form a cemented lens (including two lenses).

The second lens group G2 includes, in order from the object side, the fourth lens E4 which is a negative meniscus lens having a convex surface toward the object side, consisting of a hybrid aspheric lens having an aspheric surface formed by applying a resin layer to its surface on the object side, the fifth lens E5 consisting of a biconvex positive lens including a stronger convex surface toward the image side, and the sixth lens E6 which is a negative meniscus lens having a convex surface toward the image side, consisting of an aspheric lens having an aspheric surface on its image side. The fifth lens E5 and the sixth lens E6 are in close contact with each other and are joined together to form a cemented lens (including two lenses).

The aperture stop AD is disposed between the second lens group G2 and the third lens group G3.

The third lens group G3 includes, in order from the object side, the seventh lens E7 consisting of a positive lens having two aspheric surfaces and with a biconvex shape in which a stronger convex surface toward the object side, the eighth lens E8 consisting of a biconvex positive lens having a stronger convex surface toward the image side, and the ninth lens E9 consisting of a biconcave negative lens formed on its both surfaces with two concave surfaces having nearly equal curvatures, respectively. The eighth lens E8 and the ninth lens E9 are in close contact with each other and are joined together to form a cemented lens (including two lenses).

The fourth lens group G4 has only the tenth lens E10 consisting of a positive meniscus lens having a convex surface toward the object side and forming an aspheric surface on the object side.

Namely, the zoom lens unit of Example 6 has a substantially similar structure to that of the above-mentioned Example 6, except that the surface nearest to the image side, of the second lens group G2, i.e., the surface of the sixth lens E6 on the image side (surface number 11) is not applied with a resin layer, and the second lens of the first lens group G1, i.e., the second lens E2 is a plane-convex lens having a convex surface toward the object side, and the second lens of the third lens group G3, i.e., the eighth lens E8 is a biconvex lens having a stronger convex surface toward the image side, and the third lens of the third lens group G3, i.e., the ninth lens E9 is a biconcave lens, curvature radii of both surfaces of which being nearly equal.

In this case, as illustrated in FIGS. 21A to 21C, when changing magnification from the wide-angle end to the telephoto end, the first lens group G1 and the third lens group G3 are moved from the image side to the object side monotonously, the second lens group G2 is moved from the object side to the image side almost monotonously, and the fourth lens group G4 is moved to the object side with a convex trajectory.

In Example 6, focal length of an entire zoom lens unit system, f, F-number, F, and a half-field angle, ω, change within ranges of, f=5.05-52.0, F=3.67-5.87, ω=39.2-4.54, respectively, in accordance with zooming.

Optical properties of each optical component are shown in the following table.

TABLE 11 f = 5.05-52.0, F = 3.67-5.87, ω = 39.2-4.54

| Surface No. | R | D | nd | vd | Glass | | Remarks | | |
|---|---|---|---|---|---|---|---|---|---|
| 1 | 44.3171 | 1.03 | | | | | | E1 | G1 |
| | | | 2.00069 | 25.46 | HOYA | TAFD40 | | | |
| 2 | 26.0958 | 3.18135 | | | | | | E2 | |
| | | | 1.603 | 65.44 | OHARA | SPHM53 | | | |
| 3 | ∞ | 0.1 | | | | | | | |
| 4 | 20.885 | 2.49398 | | | | | | E3 | |
| | | | 1.72916 | 54.68 | OHARA | SLAL18 | | | |
| 5 | 57.3467 | Variable DA | | | | | | | |
| 6* | 126.698 | 0.04 | 1.5202 | 52.02 | | | Resin layer | E4 | G2 |
| 7 | 50.5005 | 0.8 | | | | | | | |
| | | | 2.00069 | 25.46 | HOYA | TAFD40 | | | |
| 8 | 4.95265 | 2.28123 | | | | | | | |
| 9 | 92.143 | 3.49045 | | | | | | E5 | |
| | | | 1.84666 | 23.78 | HOYA | FDS90 | | | |
| 10 | −5.0956 | 0.61 | | | | | | E6 | |
| | | | 1.8208 | 42.71 | HOYA | MTAFD51 | | | |
| 11* | −91.662 | Variable DB | | | | | | | |
| 12 | ∞ | Variable DC | | | | | Aperture Stop | AD | |
| 13* | 6.29816 | 4.13431 | | | | | | E7 | G3 |
| | | | 1.48749 | 70.44 | HOYA | FC5 | $\theta_{gF}=$ 0.5305 | | |
| 14* | −8.7832 | 0.1 | | | | | | | |
| 15 | 8.3995 | 2.95605 | | | | | | E8 | |
| | | | 1.5186 | 69.98 | HIKARI | EPKH1 | $\theta_{gF}=$ 0.5318 | | |
| 16 | −6.2962 | 0.81742 | | | | | | E9 | |
| | | | 1.85026 | 32.35 | HIKARI | ELASF021 | | | |
| 17 | 6.29619 | Variable DD | | | | | | | |
| 18* | 9.12983 | 2.07 | | | | | | E10 | G4 |
| | | | 1.52528 | 56.2 | | Plastic | | | |
| 19 | 42.8851 | — | | | | | | | |
| 20 | ∞ | 0.28 | | | | | | FM | |
| | | | 1.5377 | 66.6 | | | | | |
| 21 | ∞ | 0.1 | | | | | | | |
| 22 | ∞ | 0.5 | | | | | | | |
| | | | 1.5 | 6.4 | | | | | |
| 23 | ∞ | — | | | | | | | |

In Table 11, each optical surface of the sixth surface, the eleventh surface, the thirteenth surface, the fourteenth surface and the eighteenth surface shown with an asterisk "*" is the aspheric surface. Parameters in the formula (A) of each aspheric surface are represented in the following table.

Aspheric Surface Parameters
Sixth Surface
K=0, $A_4$=1.61812×10$^{-4}$, $A_6$=−8.77148×10$^{-6}$, $A_8$=6.64153× 10$^{-7}$, $A_{10}$=−2.61706×10$^{-8}$, $A_{12}$=4.90817×10$^{-10}$, $A_{14}$=−3.58555×10$^{-12}$ Eleventh Surface
K=0, $A_4$=−3.34755×10$^{-4}$, $A_6$=−1.46643×10$^{-6}$, $A_8$=1.45680× 10$^{-7}$, $A_{10}$=−2.98204×10$^{-8}$, $A_{12}$=8.56606×10$^{-11}$ Thirteenth Surface
K=0, $A_4$=−6.03552×10$^{-4}$, $A_6$=7.15076×10$^{-6}$, $A_8$=−6.86505× 10$^{-7}$, $A_{10}$=9.64137×10$^{-9}$, $A_{12}$=−4.18827×10$^{-10}$ Fourteenth Surface
K=0, $A_4$=3.20064×10$^{-4}$, $A_6$=4.81813×10$^{-6}$, $A_8$=3.04886× 10$^{-8}$, $A_{10}$=−1.58516×10$^{-8}$ Eighteenth Surface
K=0, $A_4$=−1.00058×10$^{-4}$, $A_6$=3.53642×10$^{-6}$, $A_8$=−1.37159× 10$^{-7}$, $A_{10}$=1.92665×10$^{-9}$ The variable distance DA between the first lens group G1 and the second lens group G2, the variable distance DB between the second lens group G2 and the aperture stop AD, the variable distance DC between the aperture stop AD and the third lens group G3, and the variable distance DD between the third lens group G3 and the fourth lens group G4 are varied in accordance with zooming, as represented in the following table.

TABLE 12

| | Variable Distance | | |
|---|---|---|---|
| | Wide-angle end | Intermediate focal length | Telephoto end |
| f | 5.047 | 16.2 | 51.97 |
| D A | 0.64 | 10.77025 | 18.61 |
| D B | 10.098 | 1.39139 | 0.8 |
| D C | 6.42866 | 5.80645 | 0.95 |
| D D | 3.62932 | 6.81779 | 14.38379 |

(1) Glass used for the positive lens of the third lens group G3 of Example 6 is included in a range defined by the "regulation line 1a" and the "regulation line 1b" which are defined by the formula (1), as illustrated in FIG. 26.

In addition, values corresponding to the formulae (2) to (6) are as follows:

$$n_{nave} - n_{pave} = 0.347 \tag{2}$$

$$Tpr = 1.218 \tag{3}$$

$$\theta_{gF} = 0.550 \tag{4}$$

$$Ft/Fw = 10.297 \tag{5}$$

$$Y'/Fw = 0.818 \tag{6}$$

Figure 24:
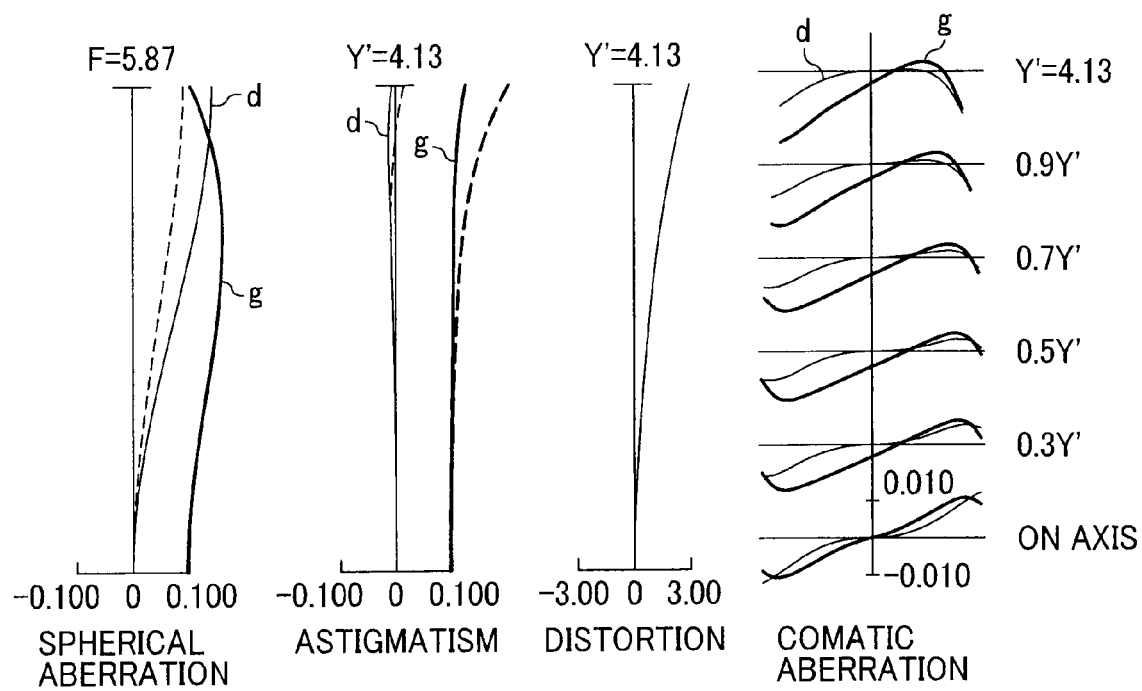
FIG. 24 is a view illustrating aberration diagrams of spherical aberration, astigmatism, distortion and comatic aberration at the telephoto end of the zoom lens unit of Example 6 illustrated in FIGS. 21A to 21C.

In addition, FIGS. 22 to 24 illustrate aberration diagrams of each aberration of spherical aberration, astigmatism, distortion and comatic aberration at the wide-angle end, at the intermediate focal length, and at the telephoto end, of Example 6, respectively.

Accordingly, the zoom lens unit, and the information device according to embodiments of the present invention at least have the following advantages.

It is possible to provide a compact zoom lens unit which has a half-field angle at a wide-angle end of 38 degrees or more which is a sufficient wide angle, and a magnification ratio of 9 times or more, and in which aberration corrections are performed completely, and which has a resolution corresponding to an imaging element having high resolution, and to provide a compact information device having a photographing function with a high performance by using the above-mentioned zoom lens unit as a photographing optical system.

Especially, it is possible to provide a zoom lens unit with a wide angle and a high magnification ratio, which is compact enough and has high performance such that aberrations are few, and to provide an information device with a photographing function which use the zoom lens unit as a photographing optical system.

In addition, it is possible to provide a zoom lens unit for which cost can be reduced and degree of freedom of selection of a glass material can be improved, and to provide an information device with a photographing function which use the zoom lens unit as a photographing optical system.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:

1. A zoom lens unit, comprising in order from an object side to an image side:
   a first lens group having a positive refracting power;
   a second lens group having a negative refracting power;
   a third lens group having a positive refracting power; and
   a fourth lens group having a positive refracting power,
   an aperture stop being disposed on an object side of the third lens group,
   and when changing magnification from a wide-angle end to a telephoto end, all the lens groups are moved, and an interval between the first lens group and the second lens group increases, an interval between the second lens group and the third lens group decreases, and an interval between the third lens group and the fourth lens group increases,
   wherein the third lens group has at least two positive lenses and one negative lens, and
   wherein all the positive lenses of the third lens group satisfy the following formula:

$$-0.005865 v_{d3p} + 0.93226 < \theta_{gF3p} < -0.005865 v_{d3p} + 0.95226 \quad (1)$$

where, $v_{d3p}$ represents an Abbe number of each of the positive lenses of the third lens group, and $\theta_{gF3p}$ represents a partial dispersion ratio of each of the positive lenses of the third lens group which is defined by the formula: $\theta_{gF3p} = (n_g - n_F)/(n_F - n_C)$, $n_g$, $n_F$ and $n_C$ representing refractive indexes for g line, F line and C line, respectively.

2. A zoom lens unit according to claim 1, wherein all the negative lenses and all the positive lenses of the third lens group satisfy the following formula:

$$0.15 < n_{nave} - n_{pave} < 0.40 \quad (2)$$

where, $n_{nave}$ represents an average refractive index of all the negative lenses of the third lens group, and $n_{pave}$ represents an average refractive index of all the positive lenses of the third lens group.

3. A zoom lens unit according to claim 1, wherein the third lens group has at least in order from the object side, a positive lens, a positive lens and a negative lens.

4. A zoom lens unit according to claim 1, wherein the third lens group consists of two positive lenses and one negative lens.

5. A zoom lens unit according to claim 1, wherein the second lens group has in order from the object side, a negative lens, a positive lens and a negative lens.

6. A zoom lens unit according to claim 1, wherein the following formula is satisfied:

$$1.0 < Tpr < 1.5 \quad (3)$$

where, Tpr represents a telephoto ratio obtained by dividing a total length of the entire zoom lens unit system at the telephoto end by a focal length of the entire zoom lens unit system at the telephoto end.

7. A zoom lens unit according to claim 1, wherein at least one negative lens of the second lens group is a hybrid aspheric lens.

8. A zoom lens unit according to claim 1, wherein the first lens group has one negative lens and two positive lenses.

9. A zoom lens unit according to claim 1, wherein a lens nearest to the object side, of the third lens group, has an aspheric surface.

10. A zoom lens unit according to claim 1, wherein the fourth lens group has at least one positive lens, and a surface nearest to the object side, of the fourth lens group, is an aspheric surface, and
    wherein the following formula is satisfied:

$$\theta_{gF} < 0.551 \quad (4)$$

where, $\theta_{gF}$ represents a partial dispersion ratio of the positive lens of the fourth lens group, defined by $(n_g - n_F)/(n_F - n_C)$, $n_g$, $n_F$ and $n_C$ representing refractive indexes for g line, F line and C line, respectively.

11. A zoom lens unit according to claim 1, wherein the following formula is satisfied:

$$Ft/Fw > 9 \quad (5)$$

where, Fw and Ft represent focal lengths of the entire zoom lens unit system at the wide-angle end and the telephoto end respectively.

12. A zoom lens unit according to claim 1, wherein the following formula is satisfied:

$$0.78 < Y'/Fw \quad (6)$$

where, Y' represents a maximum image height, and Fw represents the focal length at the wide-angle end.

13. A zoom lens unit according to claim 1, wherein when changing magnification from the wide-angle end to the telephoto end, the first and the third lens groups are moved to the object side, the second lens group is moved to the image side with a convex curve or a part of the convex curve, the fourth lens group is moved to the object side with a convex curve or a part of the convex curve, and the aperture stop is moved independently of each lens group.

14. An information device with a photographing function, including the zoom lens unit according to claim 1, as a photographing optical system.

15. An information device according to claim 14, in which an object image by the zoom lens unit is formed onto a light receiving plane of an imaging element.

16. An information device according to claim 14, which is configured as a portable information terminal device.

17. An information device according to claim 15, which is configured as a portable information terminal device.

* * * * *